United States Patent
Parry et al.

(10) Patent No.: US 12,074,869 B2
(45) Date of Patent: Aug. 27, 2024

(54) METHOD AND APPARATUS FOR AUTHENTICATION OF A USER TO A SERVER USING RELATIVE MOVEMENT

(71) Applicant: VNS Portfolio LLC, Calabasas, CA (US)

(72) Inventors: Beau Robertson Parry, Cincinnati, OH (US); Yasodekshna Boddeti, Okemos, MI (US)

(73) Assignee: VNS Portfolio LLC, Calabasas, CA (US)

( * ) Notice: Subject to any disclaimer, the term of this patent is extended or adjusted under 35 U.S.C. 154(b) by 126 days.

(21) Appl. No.: 17/571,358

(22) Filed: Jan. 7, 2022

(65) Prior Publication Data

US 2022/0210152 A1     Jun. 30, 2022

Related U.S. Application Data

(63) Continuation of application No. 16/748,373, filed on Jan. 21, 2020, now Pat. No. 11,245,693, which is a continuation of application No. 16/017,829, filed on Jun. 25, 2018, now Pat. No. 10,565,362, which is a continuation of application No. 15/675,357, filed on Aug. 11, 2017, now Pat. No. 10,049,203, which is a continuation of application No. 15/460,194, filed on Mar. 15, 2017, now Pat. No. 9,740,848, which is a (Continued)

(51) Int. Cl.
| | |
|---|---|
| H04L 29/06 | (2006.01) |
| G06F 21/31 | (2013.01) |
| G06F 21/36 | (2013.01) |
| G06V 40/70 | (2022.01) |
| H04L 9/08 | (2006.01) |
| H04L 9/40 | (2022.01) |
| H04N 7/18 | (2006.01) |
| H04W 12/06 | (2021.01) |
| H04W 12/65 | (2021.01) |
| H04W 12/68 | (2021.01) |

(52) U.S. Cl.
CPC ........ *H04L 63/0861* (2013.01); *G06F 21/316* (2013.01); *G06F 21/36* (2013.01); *G06V 40/70* (2022.01); *H04L 9/0866* (2013.01); *H04L 63/0428* (2013.01); *H04L 63/10* (2013.01); *H04L 63/107* (2013.01); *H04L 63/126* (2013.01); *H04N 7/183* (2013.01); *H04W 12/068* (2021.01); *H04W 12/65* (2021.01); *H04W 12/68* (2021.01)

(58) Field of Classification Search
CPC ... G06F 21/316; H04L 63/0428; H04L 63/10; H04L 63/107; H04L 63/126; H04L 9/0892
USPC ........................................................... 726/7
See application file for complete search history.

(56) References Cited

U.S. PATENT DOCUMENTS

| | | | | |
|---|---|---|---|---|
| 7,308,581 | B1* | 12/2007 | Geosimonian | G06F 21/34 713/184 |
| 8,244,211 | B2* | 8/2012 | Clark | G06F 21/32 455/410 |

(Continued)

*Primary Examiner* — Longbit Chai
(74) *Attorney, Agent, or Firm* — Larry E. Henneman, Jr.; Henneman & Associates, PLC

(57) ABSTRACT

Method and apparatus for authentication of a user to a server that involves the user performing a requested act and that further involves relative movement between the user and a camera wherein fiducial marks are captured.

18 Claims, 25 Drawing Sheets

Related U.S. Application Data continuation of application No. 14/827,134, filed on Aug. 14, 2015, now Pat. No. 9,600,649, which is a continuation of application No. 13/829,180, filed on Mar. 14, 2013, now Pat. No. 9,137,246.

(60) Provisional application No. 61/621,728, filed on Apr. 9, 2012.

(56) References Cited

U.S. PATENT DOCUMENTS

| | | | |
|---|---|---|---|
| 2007/0199076 A1* | 8/2007 | Rensin | H04N 21/42202 726/27 |
| 2011/0314539 A1* | 12/2011 | Horton | H04W 12/30 726/20 |

* cited by examiner

METHOD AND APPARATUS FOR AUTHENTICATION OF A USER TO A SERVER USING RELATIVE MOVEMENT

CROSS-REFERENCE TO RELATED APPLICATION

This application is a continuation of co-pending U.S. application Ser. No. 16/748,373, filed on Jan. 21, 2020 by the same inventors, which is a continuation of U.S. application Ser. No. 16/017,829, filed Jun. 25, 2018 by the same inventors, which is a continuation of U.S. application Ser. No. 15/675,357, filed on Aug. 11, 2017 by the same inventors and entitled "METHOD AND APPARATUS FOR AUTHENTICATION OF A USER TO A SERVER USING RELATIVE MOVEMENT", which is a continuation of prior U.S. application Ser. No. 15/460,194, filed Mar. 15, 2017 by the same inventors and entitled "AUTHENTICATION METHOD USING RELATIVE MOVEMENT", which is a continuation of prior U.S. application Ser. No. 14/827,134, filed Aug. 14, 2015 by the same inventors and entitled "AUTHENTICATION METHOD USING LIVENESS VERIFICATION", which is a continuation of U.S. application Ser. No. 13/829,180, filed on Mar. 14, 2013 by the same inventors and entitled "SYSTEMS, METHODS AND APPARATUS FOR MULTIVARIATE AUTHENTICATION", which claims the benefit of U.S. provisional patent application Ser. No. 61/621,728, filed on Apr. 9, 2012, entitled "SYSTEMS AND METHODS FOR MULTIVARIATE AUTHENTICATION", the disclosures of which are all hereby incorporated by reference herein in their respective entireties.

BACKGROUND OF THE INVENTION

Description of the Background Art

User authentication has become increasingly of interest as Internet and network-based computer usage have become more prevalent and capabilities of these media have grown. The significance of user authentication has also increased as businesses, government departments, medical organizations and individuals have become increasingly reliant on computer networks and on the security of proprietary information transmitted across networks to users of computing devices.

SUMMARY

In accordance with one embodiment, a computer-based method of authenticating is provided. The method comprises receiving a request for authentication of a user. The request for authentication comprises biometric feature of the user collected by a user device and contextual data from the user device. The method also comprises comparing the biometric feature of the user to baseline biometric feature of the user, comparing the contextual data to an expected contextual data value, and determining whether to authenticate the user based on the comparison of the biometric feature of the user to the baseline biometric feature of the user and the comparison of the contextual data to the expected contextual data value.

In accordance with another embodiment a computer-based authentication system is provided. The system comprises a baseline image database, a contextual data database, and an authentication computing system. The authentication system is configured to receive a request for authentication of a user from a user device. The request for authentication comprises an image of the user and contextual data. The authentication system is also configured to compare the image of the user to a baseline image of the user stored in the baseline image database, compare the contextual data to an expected contextual data value stored in the contextual data database, and determine whether to authenticate the user based on the comparison of the biometric feature of the user to the baseline image of the user and the comparison of the contextual data to the expected contextual data value.

In accordance with another embodiment a non-transitory computer readable medium having instructions stored thereon is provided. When the instructions are executed by a processor, they cause the processor to receive a request for authentication of a user. The request for authentication comprises an image of the user collected by a user device and contextual data from the user device. When the instructions are executed by a processor, they also cause the processor to compare the image of the user to a baseline image of the user, compare the contextual data to an expected contextual data value and determine whether to authenticate the user based on the comparison of the biometric feature of the user to the baseline image of the user and the comparison of the contextual data to the expected contextual data value.

In accordance with another embodiment a non-transitory computer readable medium having instructions stored thereon is provided. When the instructions are executed by a processor, they cause the processor to receive from a first user device via a network communication a network packet comprising an electronic data file and recipient biometrics and receive from a second user device via network communication biometric data obtained from a user of the second user device. When the biometric data obtained from the use of the second user device matches the recipient biometrics, the electronic data file is permitted to be accessed on the second user device.

In accordance with yet another embodiment a method of electronically sharing data is provided. The method comprises identifying an electronic file, providing biometrics associated with a recipient, providing contextual data associated with a recipient, causing the electronic file to be encrypted based on the provided biometrics and the provided contextual data and causing the transmission of the encrypted with another embodiment.

BRIEF DESCRIPTION OF THE DRAWINGS

The present disclosure will be more readily understood from a detailed description of some example embodiments taken in conjunction with the following figures.

DETAILED DESCRIPTION

Figure 1:
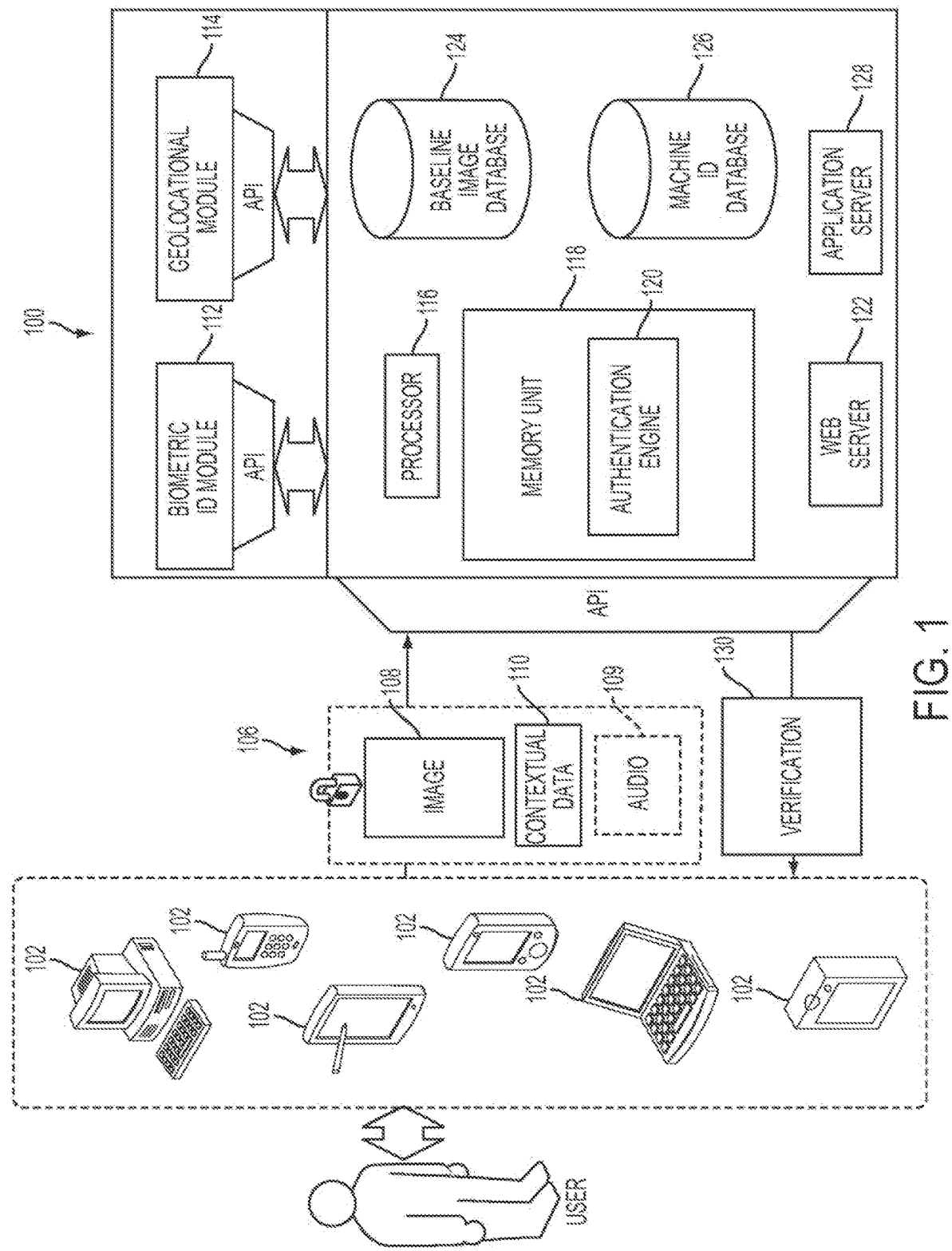
FIG. 1 illustrates an example authentication computing system that receives and process identity-based information for use authorization.

Various non-limiting embodiments of the present disclosure will now be described to provide an overall understanding of the principles of the structure, function, and use of the authentication systems and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The presently disclosed embodiments are generally directed to user identification and authorization. Such systems and methods may be implemented in a wide variety of contexts. In one example embodiment, the presently disclosed systems and methods allow the identity of a user of a computing device to be authenticated. The user may be authenticated though a multivariate platform, as described in more detail below. In some embodiments, the authentication process may process an image supplied by the computing device to the authentication computing system. The process may utilize a biometric attribute of the user along with one or more additional authentication variables in order to confirm an identity of the user. The image may, for example, include a user gesture, a flash burst, or other authentication variable. The gesture, the relative location of the gesture, and/or the relative location of the flash may be compared to a baseline image as part of the authentication process. In some implementations, contextual data associated with the image may be processed as part of the authentication process. Such contextual data (sometimes referred to as "metadata") may include, without limitation, a machine ID, device data, or geographical/locational information. As described in more detail below, contextual data may also include data obtained from sensors onboard a user computer device. Example sensors include accelerometers, magnetometers, proximity sensors, and the like. Such sensors may provide contextual data such as movement data and user device orientation data, for example.

In some example embodiments, a computing device may display a particular color on its graphical display screen during an authentication process. The particular color may have been provided to the computing device by an authentication system. The image subsequently provided to the authentication computing system by the computer device may include an image of the user with the particular color reflected off of facial features of a user to form a color signature. Along with biometrical facial features of the user, the particular color present in the image and the color signature may be analyzed by an authentication computing system to provide user authentication.

In some example embodiments, at least some of the communication between a computing device and an authentication computing system is encrypted using any suitable encryption technique. In one example embodiment, chaos-based image encryption may be used, although this disclosure is not so limited. Additional details regarding chaos-based image encryption may be found in "Chaos-Based Image Encryption" by Yaobin Mao and Guaron Chen (available at http://www.open-image.org/725publication/journal/CBIE.pdf), which is incorporated herein by reference. In one example embodiment, images provided to the authentication computing system by a computing device are encrypted though a pixel-rotation technique, a codec watermarking technique, and/or other encrypting technique.

Generally, the presently disclosed systems and methods may authenticate a user before giving the user access to a mobile computer device, access to an application on a computer device, access to a building or other structure, access to a web portal, access to any other type of computing device, access to data, or access to any other secured virtual or physical destination. The authentication can be based on a combination of biometric analysis and contextual data analysis, with the contextual data based on a user device of the user seeking authentication. Therefore, the presently disclosed systems and methods generally bind man and machine to effectuate the authentication paradigms described in more detail below.

Reference throughout the specification to "various embodiments," "some embodiments," "one embodiment," "some example embodiments," "one example embodiment," or "an embodiment" means that a particular feature, structure, or characteristic described in connection with the embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Referring now to FIG. 1, one example embodiment of the present disclosure may comprise an authentication computing system 100 that receives and processes identity-based information to execute user authorization. The authentication computing system 100 may be provided using any suitable processor-based device or system, such as a personal computer, laptop, server, mainframe, or a collection (e.g., network) of multiple computers, for example. The authentication computing system 100 may include one or more processors 116 and one or more computer memory units 118. For convenience, only one processor 116 and only one memory unit 118 are shown in FIG. 1. The processor 116 may execute software instructions stored on the memory unit 118. The processor 116 may be implemented as an integrated circuit (IC) having one or multiple cores. The memory unit 118 may include volatile and/or non-volatile memory units. Volatile memory units may include random access memory (RAM), for example. Non-volatile memory units may include read only memory (ROM), for example, as well as mechanical non-volatile memory systems, such as, for example, a hard disk drive, an optical disk drive, etc. The RAM and/or ROM memory units may be implemented as discrete memory ICs, for example.

The memory unit 118 may store executable software and data for authentication engine 120. When the processor 116 of the authentication computing system 100 executes the software of the authentication engine 120, the processor 116 may be caused to perform the various operations of the authentication computing system 100, such as send information to remote computer devices, process information received from remote computer devices, and provide authentication information to the remote computer devices, as discussed in more detail below. Data used by the authentication engine 120 may be from various sources, such as a baseline image database 124, which may be an electronic computer database, for example. The data stored in the baseline image database 124 may be stored in a non-volatile computer memory, such as a hard disk drive, a read only memory (e.g., a ROM IC), or other types of non-volatile memory. Also, the data of the database 124 may be stored on a remote electronic computer system, for example. Machine ID database 126, which may be an electronic computer database, for example, may also provide used by the authentication engine 120. The data stored in the machine ID database 126 may be stored in a non-volatile computer memory, such as a hard disk drive, a read only memory (e.g., a ROM IC), or other types of non-volatile memory. Also, the data of the Machine ID database 126 may be stored on a remote electronic computer system, for example. In some embodiments, the Machine ID database comprises mobile equipment identification (MEID) numbers, Electronic Serial Numbers (ESN), and/or other suitable identifying indicia that may be used to identify electronic devices. While machine ID database 126 is illustrated as storing expected contextual data related to an identifier of a user device, it is to be appreciated that other embodiments may utilize other databases configured to store other forms of expected contextual data (expected movement data, expected geolocational data, expected magnetic data, and so forth) that may be compared to contextual data received from a user device during an authentication process.

The authentication computing system 100 may be in communication with user devices 102 via an electronic communications network (not shown). The communications network may include a number of computer and/or data networks, including the Internet, LANs, WANs, GPRS networks, etc., and may comprise wired and/or wireless communication links. In some example embodiments, an authentication system API is used to pass information between the user devices 102 and the authentication computing system 100. The user devices 102 that communicate with the authentication computing system 100 may be any type of client device suitable for communication over the network, such as a personal computer, a laptop computer, or a netbook computer, for example. In some example embodiments, a user may communicate with the network via a user device 102 that is a combination handheld computer and mobile telephone, sometimes referred to as a smart phone. It can be appreciated that while certain embodiments may be described with users communication via a smart phone or laptop by way of example, the communication may be implemented using other types of user equipment (UE) or wireless computing devices such as a mobile telephone, personal digital assistant (PDA), combination mobile telephone/PDA, handheld device, mobile unit, subscriber station, game device, messaging device, media player, pager, or other suitable mobile communications devices. Further, in some example embodiments, the user device may be fixed to a building, vehicle, or other physical structure.

Some of the user devices 102 also may support wireless wide area network (WWAN) data communications services including Internet access. Examples of WWAN data communications services may include Evolution-Data Optimized or Evolution-Data only (EV-DO), Evolution For Data and Voice (EV-DV), CDMA/1×RTT, GSM with General Packet Radio Service systems (GSM/GPRS), Enhanced Data Rates for Global Evolution (EDGE), High Speed Downlink Packet Access (HSDPA), High Speed Uplink Packet Access (HSUPA), and others. The user device 102 may provide wireless local area network (WLAN) data communications functionality in accordance with the Institute of Electrical and Electronics Engineers (IEEE) 802.xx series of protocols, such as the IEEE 802.11a/b/g/n series of standard protocols and variants (also referred to as "Wi-Fi"), the IEEE 802.16 series of standard protocols and variants (also referred to as "WiMAX"), the IEEE 802.20 series of standard protocols and variants, and others.

In some example embodiments, the user device 102 also may be arranged to perform data communications functionality in accordance with shorter range wireless networks, such as a wireless personal area network (PAN) offering Bluetooth® data communications services in accordance with the Bluetooth®. Special Interest Group (SIG) series of protocols, specifications, profiles, and so forth. Other examples of shorter range wireless networks may employ infrared (IR) techniques or near-field communication techniques and protocols, such as electromagnetic induction (EMI) techniques including passive or active radio-frequency identification (RFID) protocols and devices.

The user device 102 may comprise various radio elements, including a radio processor, one or more transceivers, amplifiers, filters, switches, and so forth to provide voice and/or data communication functionality. It may be appreciated that the user device 102 may operate in accordance with different types of wireless network systems utilize different radio elements to implement different communication techniques. The user device 102 also may comprise various input/output (I/O) interfaces for supporting different types of connections such as a serial connection port, an IR port, a Bluetooth® interface, a network interface, a Wi-Fi interface, a WiMax interface, a cellular network interface, a wireless network interface card (WNIC), a transceiver, and so forth. The user device 102 may comprise one or more internal and/or external antennas to support operation in multiple frequency bands or sub-bands such as the 2.4 GHz range of the ISM frequency band for Wi-Fi and Bluetooth® communications, one or more of the 850 MHz, 900 MHZ, 1800 MHz, and 1900 MHz frequency bands for GSM, CDMA, TDMA, NAMPS, cellular, and/or PCS communications, the 2100 MHz frequency band for CDMA2000/EV-DO and/or WCDMA/JMTS communications, the 1575 MHz frequency band for Global Positioning System (GPS) operations, and others.

The user device 102 may provide a variety of applications for allowing a user to accomplish one or more specific tasks using the authentication computing system 100. Applications may include, without limitation, a web browser application (e.g., INTERNET EXPLORER, MOZILLA, FIREFOX, SAFARI, OPERA, NETSCAPE NAVIGATOR) telephone application (e.g., cellular, VoIP, PTT), networking application, messaging application (e.g., e-mail, IM, SMS, MMS, BLACKBERRY Messenger), contacts application, calendar application and so forth. The user device 102 may comprise various software programs such as system programs and applications to provide computing capabilities in accordance with the described embodiments. System programs may include, without limitation, an operating system (OS), device drivers, programming tools, utility programs, software libraries, application programming interfaces (APIs), and so forth. Exemplary operating systems may include, for example, a PALM OS, MICROSOFT OS, APPLE OS, UNIX OS, LINUX OS, SYMBIAN OS, EMBEDIX OS, Binary Run-time Environment for Wireless (BREW) OS, JavaOS, a Wireless Application Protocol (WAP) OS, and others.

In general, an application may provide a user interface to communicate information between the authentication computing system 100 and the user via user devices 102. The user devices 102 may include various components for interacting with the application such as a display for presenting the user interface and a keypad for inputting data and/or commands. The user devices 102 may include other components for use with one or more applications such as a stylus, a touch-sensitive screen, keys (e.g., input keys, preset and programmable hot keys), buttons (e.g., action buttons, a multidirectional navigation button, preset and programmable shortcut buttons), switches, a microphone, speakers, an audio headset, a camera, and so forth. Through the interface, the users may interact with the authentication computing system 100.

The applications may include or be implemented as executable computer program instructions stored on computer-readable storage media such as volatile or non-volatile memory capable of being retrieved and executed by a processor to provide operations for the user devices 102. The memory may also store various databases and/or other types of data structures (e.g., arrays, files, tables, records) for storing data for use by the processor and/or other elements of the user devices 102.

As shown in FIG. 1, the authentication computing system 100 may include several computer servers and databases. For example, the authentication computing system 100 may include one or more web servers 122 and application servers 128. For convenience, only one web server 122 and one application server 128 are shown in FIG. 1, although it should be recognized that this disclosure is not so limited. The web server 122 may provide a graphical web user interface through which users of the system may interact with the authentication computing system 100. The web server 122 may accept requests, such as HTTP requests, from clients (such as web browsers on the device 102), and serve the clients responses, such as HTTP responses, along with optional data content, such as web pages (e.g., HTML documents) and linked objects (such as images, etc.).

The application server 128 may provide a user interface for users who do not communicate with the authentication computing system 100 using a web browser. Such users may have special software installed on their user devices 102 that allows them to communicate with the application server 128 via the network. Such software may be downloaded, for example, from the authentication computing system 100, or other software application provider, over the network to such user devices 102. The software may also be installed on such user devices 102 by other means known in the art, such as CD-ROM, etc.

The servers 122, 128 may comprise processors (e.g., CPUs), memory units (e.g., RAM, ROM), non-volatile storage systems (e.g., hard disk drive systems), etc. The servers 122, 128 may utilize operating systems, such as Solaris, Linux, or Windows Server operating systems, for example.

Although FIG. 1 depicts a limited number of elements for purposes of illustration, it can be appreciated that the authentication computing system 100 may include more or less elements as well as other types of elements in accordance with the described embodiments. Elements of the authentication system 100 may include physical or logical entities for communicating information implemented as hardware components (e.g., computing devices, processors, logic devices), executable computer program instructions (e.g., firmware, software) to be executed by various hardware components, or combination thereof, as desired for a given set of design parameters or performance constraints.

In addition to the end user devices 102, the authentication computing system 100 may be in communication with other entities, such as a biometric ID module 112. In some example embodiments, biometric ID functionality may be supplied from one or more third party biometric services providers. One example provider of biometric services is available at http://www.face.com and accessible via an application programming interface (API). Other services may be provided by other third party providers, such as geolocational services, which may be provide by a geolocational module 114 through an API. An example geolocational service is the W3C Geolocation API provided by the World Wide Web Consortium (W3C). In some embodiments, biometric ID and/or geolocational services may be provided by the authentication computing system 100 without the aid of outside service providers. For example, biometric information of users of the system may be stored by the authentication computing system.

During an authentication event, the authentication computing system 100 may receive and process an encrypted network packet 106 from the user device 102. The encrypted network packet 106 may be encrypted using chaos-based image encryption, for example. The network packet 106 may include an image 108 and may also include contextual data 110. The image 108 may include, for example, an image of the user for biometric analysis. The image 108 may also include additional image data that may be analyzed and processed by the authentication computing system 100. For example, the additional image data may include, without limitation, a source of light at a particular location in the image relative to the user, a particular gesture by the user, a particular facial expression by the user, a particular color reflected off a portion of the user, and so forth. The contextual data 110 may include, without limitation, a machine ID, locational information, device global positioning system (GPS) information, radio-frequency identification (RFID) information, near-field communication (NFC) information, MAC address information, and so forth. For user devices 102 supporting a position determination capability, examples of position determination capability may include one or more position determination techniques such as Global Positioning System (GPS) techniques, Assisted GPS (AGPS) techniques, hybrid techniques involving GPS or AGPS in conjunction with Cell Global Identity (CGI), Enhanced Forward Link Trilateration (EFLT), Advanced Forward Link Trilateration (AFTL), Time Difference of Arrival (TDOA, Angle of Arrival (AOA), Enhanced Observed Time Difference (EOTD), or Observed Time Difference of Arrival (OTDOA), and/or any other position determination techniques in accordance with the described embodiments. The image 108 and any other information associated with the image may be purged by the user device 102 subsequent to the transmission of the image 108 to the authentication computing system 100.

The encrypted network packet 106 may be sent to the authentication computing system 100 in response to a user's interaction with the user device 102. For example, a user may be seeking to log into a restricted website, access a restricted website, access a restricted file, access a restricted building, or access a restricted computing device. Upon receipt of the encrypted network packet 106 (which may be comprised of a plurality of individual network packets) the authentication computing system 100 may decrypt the information in order to process the image 108 and any associated contextual data 110. If a third party biometric ID module 112 is used, information may be provided to the service provider through an API. For example, the biometric ID module 112 may analyze facial features of the user to ascertain identity. The additional image data in the image 108 (such as relative flash placement, for example) may be compared to a baseline image stored in the baseline image database 124. In some example embodiments, additional comparisons or analysis may be performed on the contextual data 110, the image 108, or other information contained in the encrypted network packet 106.

In some embodiments, the encrypted network packet 106 may include an audio file 109 which includes a voice of the user, in addition to the contextual data 110. The audio file 109 may be included, for example, in the place of the image 108 when an image of the user cannot be obtained. The audio file 109 may be processed by the authentication computing system 100 to compare the audio file 109 to a known voice signature of the user. The audio file 109 may be collected by the user device 102 and transmitted to the authentication computing system 100 when it is deemed, for example, that an onboard camera of the user device 102 is not functioning. In other embodiments, both the image 108 and the audio file 109 are required by the authentication computing system 100 for authentication.

Once the user has been authenticated, verification 130 indicating that the user has been property authenticated may be provided to the user device 102 by the authentication computing system 100. The verification 130 may be in any suitable form. For example, the verification 130 may indicate to an application running on the user device 102 that the user is an authorized user. Subsequent to receiving the verification, the user device 102 may allow the user to log into a restricted website, access a restricted website, access a restricted file, access a restricted building, or access a restricted computing device, for example.

FIGS. 2A-2L schematically illustrate various forms of information that may be sent to the authentication computing system 100 via an image in order to authenticate a particular user. As is to be appreciated, the illustrated images are merely examples of illustrative embodiments and are not intended to be limiting.

Figure 2A:
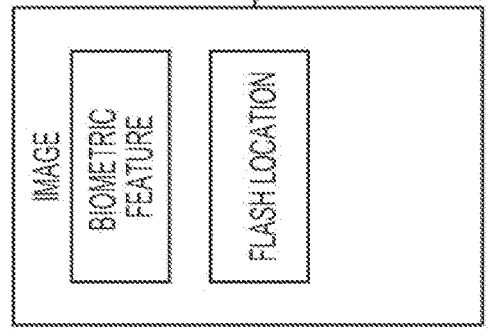
FIGS. 2A-2L schematically illustrate various forms of information that may be sent to an authentication computing system via an image in accordance with various non-limiting embodiments.
Figure 2B:
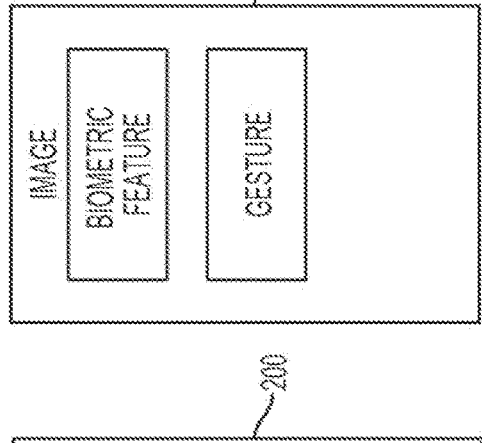
Figure 2C:
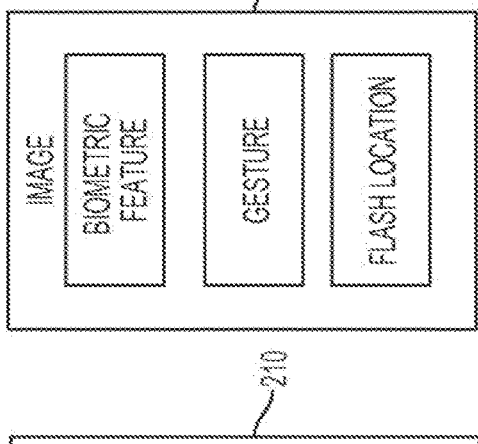
Figure 2D:
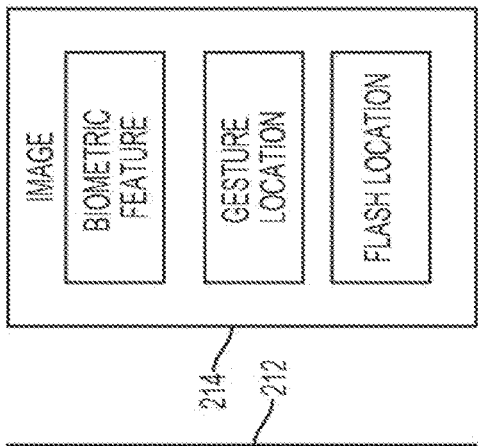

Referring first to FIG. 2A, in one example embodiment, an image 200 comprises a biometric feature and a flash location. The biometric feature may be, for example, a facial feature, a hand feature, a retinal feature, a biological sinusoidal rhythm, and so forth. The flash location, as described in more detail below, may be the relative position of a point of light relative to the biometric feature. Referring next to FIG. 2B, in one example embodiment, an image 210 comprises a biometric feature and a gesture. The gesture may be, for example, a hand gesture, a multi-hand gesture, a facial expression, an arm position, and so forth. Referring next to FIG. 2C, in one example embodiment, an image 212 comprises a biometric feature, a gesture, and a flash location. Referring next to FIG. 2D, in one example embodiment, an image 214 comprises a biometric feature, a gesture location, and a flash location.

Figure 2E:
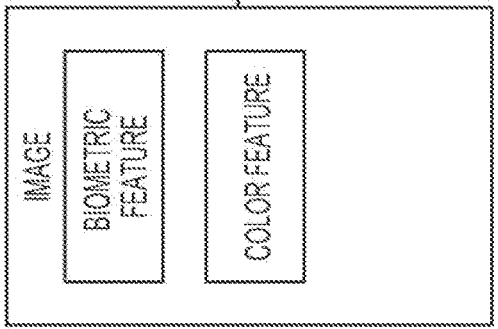
Figure 2F:
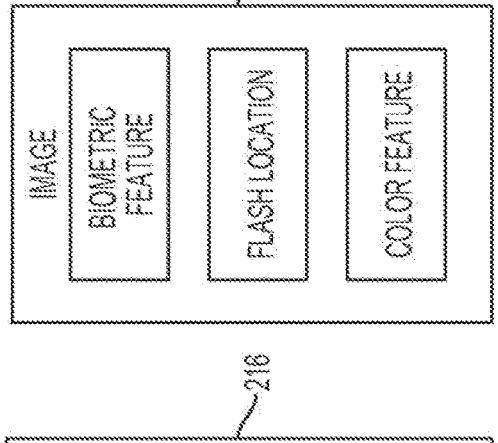
Figure 2G:
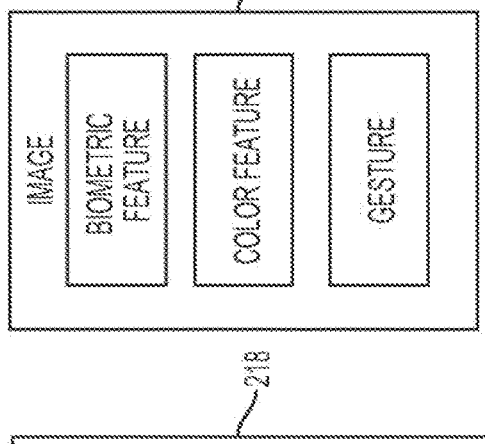

Referring to FIG. 2E, in one example embodiment, an image 216 comprises a biometric feature and a color feature. As described in more detail below, in some example embodiments, prior to capturing the image, the computer device may output a particular color on its graphical display such that can reflect off a biometric feature of the user as a color signature. The reflected color, along with the biometric features, may be analyzed by the authentication computing system 100 to confirm identity. Referring next to FIG. 2F, in one example embodiment, an image 218 comprises a biometric feature, a flash location, and a color feature. Referring next to FIG. 2G, in one example embodiment, an image 220 comprises a biometric feature, a color feature, and a gesture.

Figure 2H:
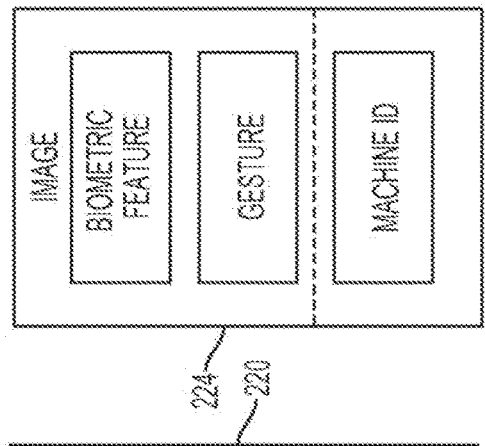

Referring to FIG. 2H, in one example embodiment, an image 224 comprises a biometric feature and a gesture. Machine ID may also be associated with the image 224 and provided to the authentication computing system 100. The machine ID may be contextual data, which may include any type of additional data, such as locational information, GPS information, RFID information, NFC information, MAC address information, device data, and so forth. The machine ID provided as contextual data may be compared to machine ID stored by the authentication computing system 100. For example, the authentication computing system 100 may compare the locational information provided with the image 224 to an expected location stored by the system. If the image 224 was not captured at a geographical location near the expected location, authentication will not be successful.

Figure 2I:
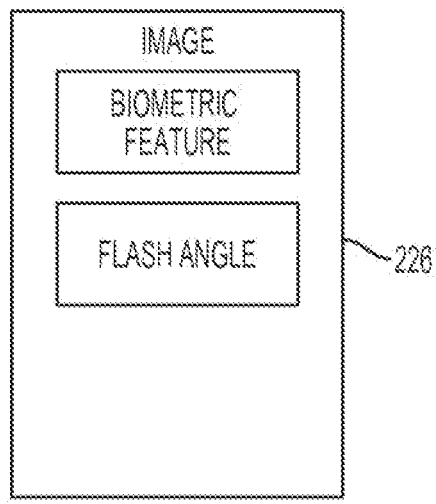
Figure 2J:
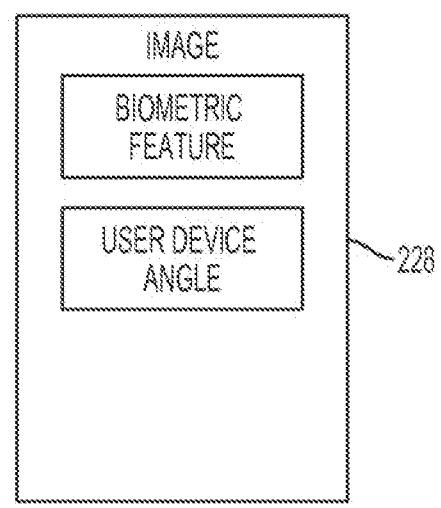

Referring to FIG. 2I, in one example embodiment, an image 226 comprises a biometric feature and a flash angle. The flash angle may be, for example, an angle of incidence of the flash. A non-limiting example of flash angle determination is described in more detail with regard to FIG. 4D. Referring now to FIG. 2J, an image 228 comprise a biometric feature and a user device angle. The value of the user device angle may be measured by an accelerometer onboard the user device, for example.

Figure 2K:
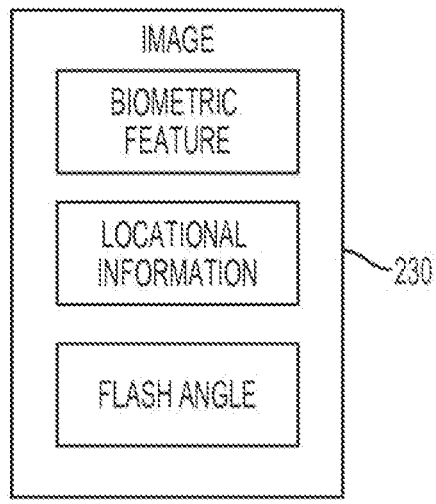

Referring now to FIG. 2K, an image 230 comprises a biometric feature and locational information. The locational information may be gathered by an on-board GPS, for example. In one embodiment, the location information can include longitude, latitude, and altitude. The image 230 may also comprise flash angle information.

Figure 2L:
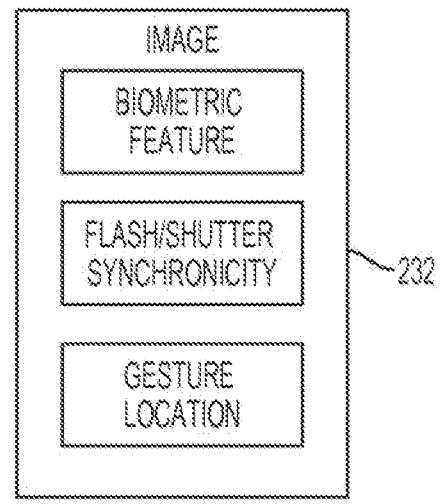

Referring next to FIG. 2L, an image 232 may comprise a biometric feature, flash/shutter synchronicity information, and a gesture location. With regard to flash/shutter synchronicity, the authentication computing system 100 may communicate with the user device 102 during the image capture process to control the relative timing of the flash and the shutter. For example, the authentication computing system 100 may cause a slight flash delay or shutter delay to give the captured image a particular flash signature. A change in the flash delay or shutter delay may result in a different flash signature. The flash signature in the image may be analyzed by the authentication computing system 100 as an authentication variable.

It is noted that the informational components of the various images illustrated in FIGS. 2A-2L are merely for illustrative purposes. In fact, images provided to the authentication computing system 100 may include any number of authentication variables and/or any combination of authentication variables. The number or combination of authentication variables transmitted with the image may depend, at least in part, on a desired level of security. In some embodiments, the number authentication variables used and/or the priority of the authentication variables may be based on the available resources at the time of authentication. As described in more detail below, example resources that may be considered included, without limitation, battery supply, data transmission rates, network signal strength, and so forth.

In some embodiments, the authentication computing system may require user authentication based on contextual operational information, such as the geographical location of the user device or the period of time since a previous successful authentication, for example. By way of example, a user of a user device may power down a user device during a plane flight. Upon arriving at the destination, the user device will be powered up. The distance between the particular geographic location of the user device upon power down and the particular geographic location of the user device upon power up can be assessed. If the distance is beyond a predetermined distance threshold, the user device may require user authentication before providing user access.

Furthermore, in some embodiments, the user device may include a plurality of data collection devices that each requires different levels of operational resources. For example, a smart phone may have two on-board cameras, a high-resolution camera and a low-resolution camera. Images captured using the low-resolution camera requires less data and, therefore, such camera may be useful during times of low data transmission rates. In such instances, the biometric data collected from the user may include periocular data, for example. If the user device is operating on a network connection having high data transmission rates, the high-resolution camera may be used. In any event, the systems and methods described herein may alter or shift the type of authentication variables considered, and the techniques for gathering such variables, based on operational or environmental factors existing at the time of the authentication request. The systems and methods described herein may use additional techniques or processes to compensate for operational conditions. For example, during low light conditions, a particular color may be displayed on a screen of the user device, such that the screen can be held proximate to the user to illuminate the user's face with that particular hue. The particular color may change over time (such as in a strobed fashion), with the shutter coordinated with the pulses of light. As such, as an additional layer of security, an image with a particular color reflected off of the user's face can be compared with an expected color.

Figure 3:
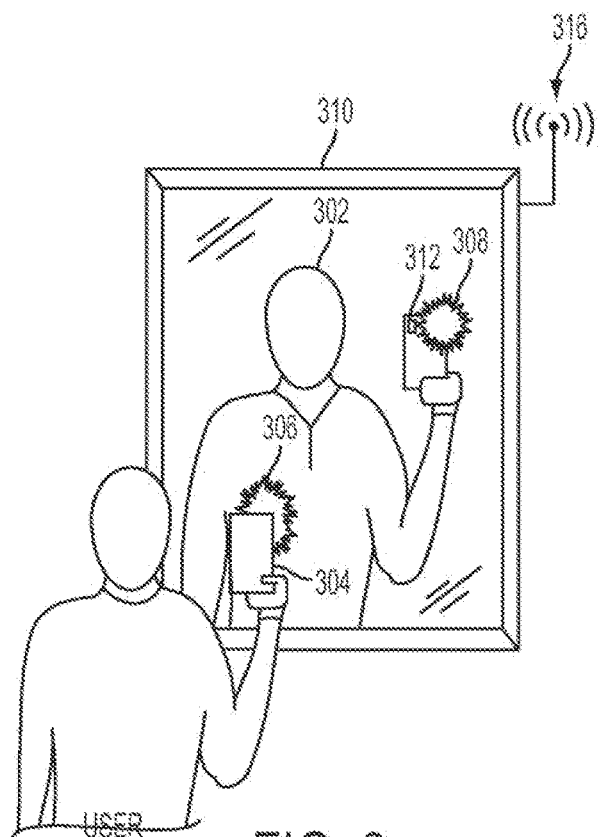
FIG. 3 illustrates a user device capturing an image of a user in accordance with one non-limiting embodiment.

FIG. 3 illustrates a user device 304 capturing an image of a user in accordance with the presently disclosed systems and methods. The user is positioned in front of a reflective surface 310, such as a mirror or reflective window, for example. Prior to capturing the image, a light source 306 (such as a flash on a smart phone) is activated. The user may then position the light source reflection 308 at a pre-defined position relative the user reflection 302. The pre-defined position may be based on a desired angle of incidence, a desired distance from the user, or other desired relative location. While not shown, in some embodiments, the user may additionally make a gesture for reflection by the reflective surface 310. Once in the proper position, a camera 312 associated with the user device 304 may capture an image of the reflective surface 310. The image, similar to image 108 in FIG. 1, for example, may be provided to an authentication computing system local to the user device 304 or to a remote authentication computing system via a networked connection. In some example embodiments, the reflective surface 310 may include a communication element 316. The communication element 316 may utilize, for example, a BLUETOOTH® communication protocol or a near-field communication protocol. The communication element 316 may provide additional data (such as contextual data) that may be transmitted along with the image to the authentication computing system.

Various forms of assistance may be provided to the user by the authentication computing system 100 during the image capture process illustrated in FIG. 3. In one embodiment, for example, a visual cue is provided to the user on the screen of the user device 304. The visual cue may provide an indication of the relative proper placement of the user device 304 in the image for a particular image capture session. The visual cue may be, without limitation, a solid dot on the screen, a flashing dot on the screen, a grid on the screen, graphical bars or lines on the screen, or any other suitable visual cue.

The particular location of the visual cue on the screen may be provided to the user device 304 by signaling from the authentication computing system 100. In various embodiments, the particular location of the visual cue may change for each image capture process (similar to a rolling code, for example). As the user positions themselves in front of the reflective surface 310, they may also position the user device 304 in the proper relative placement as noted by the visual cue. The user may also provide any additional authentication variables (such as a gesture, gesture location, user device angle, and so forth). Once the user device 304 is in the proper position the user device 304 may automatically capture the image without additional input from the user. For example, in one operational example, the screen of the user device 304 may have a visual indication flashing in the upper left quadrant of the screen. Once the user device 304 detects, through image analysis, that the user device 304 is positioned in the upper left quadrant of the image, an image may be automatically captured and transmitted to the authentication computing system 100. While in some embodiments, the user device 304 may automatically capture an image, in other embodiments the user may initiate the image capture by pressing a button (physical or virtual) on the user device 304.

It is noted that an audio cue may alternatively or additionally serve as a form of assistance. For example, when the user has positioned in the user device 304 in the proper relative position, an audible alert may be provided by the user device 304. As is to be appreciated, other forms of assistance may be used, such as haptic feedback, for example.

Figure 4A:
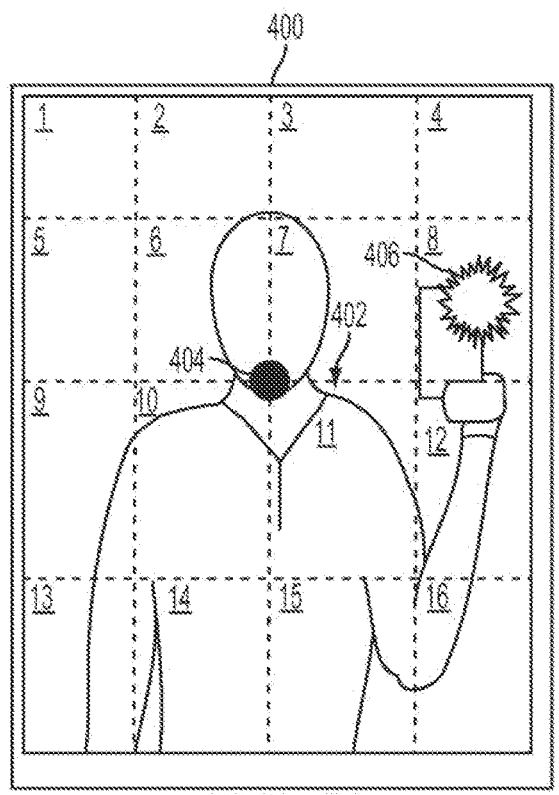
FIGS. 4A-4D illustrate various image analysis techniques in accordance with non-limiting embodiments.

The various image components of the image received from the user device 304 by an authentication computing system may be analyzed using any number of analytical techniques. FIG. 4A shows an analysis technique that divides the image 400 into a grid sixteen square segments. In one embodiment, the grid is keyed to a chin 404 of the user. As illustrated, the reflected light source 406 in the image 400 is located in segment 8. As part of the authentication, the authentication computing system analyzing the image 400 could use a two part process. First, the identity of the user could be determined by a biometric analysis of the user image 402. Second, the relative placement of the reflected light source 406 in the image could be used as an authentication variable. For example, a comparison could be made to a baseline image stored in a database in order to confirm the reflected light source 406 is in the proper segment. In some embodiments, the proper segment may change over time. In such embodiments, a user of the system would know in which segment to place the reflected light source 406 based on a time of day, day of the week, or based on where the user was physically located, for example.

Figure 4B:
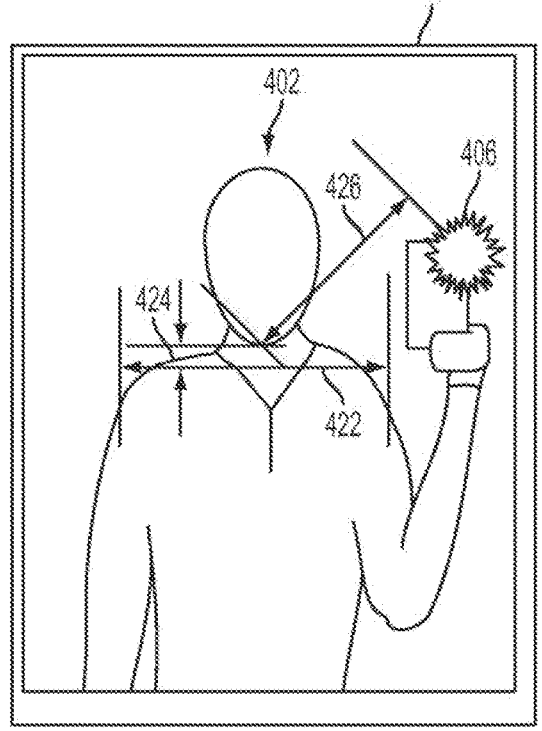

FIG. 4B shows an analysis technique that uses distances between various features of the image 420 to confirm identity and provide authorization. The illustrated embodiment shows a shoulder width distance 422, a chin to shoulder vertical distance 424, and a reflected light source to chin distance 426 as variables. In some example embodiments, a relative angle of the reflected light source may be calculated or measured and compared to a baseline angle.

Figure 4C:
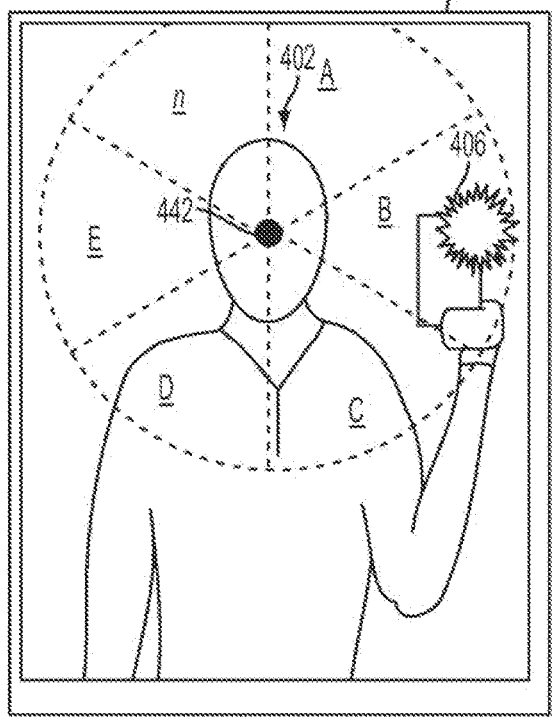

FIG. 4C shows an analysis technique that divides the image 440 into a plurality of pie shaped segments. While the illustrated embodiment shows six pie segments, this disclosure is not so limited. For example, the image 440 may be divided up into 12 pie shaped segments to emulate the face of an analog clock. The pie shaped segments may converge on the nose 442 of the user image 402, or may converge on another location (such as a gesture). As shown, the user is placing the reflected light source 406 in segment "B." Similar to the embodiment illustrated in FIG. 4A, the segment in FIG. 4C providing proper authorization may change over time. With a rolling segment approach, the overall security offered by the system may be increased.

Figure 4D:
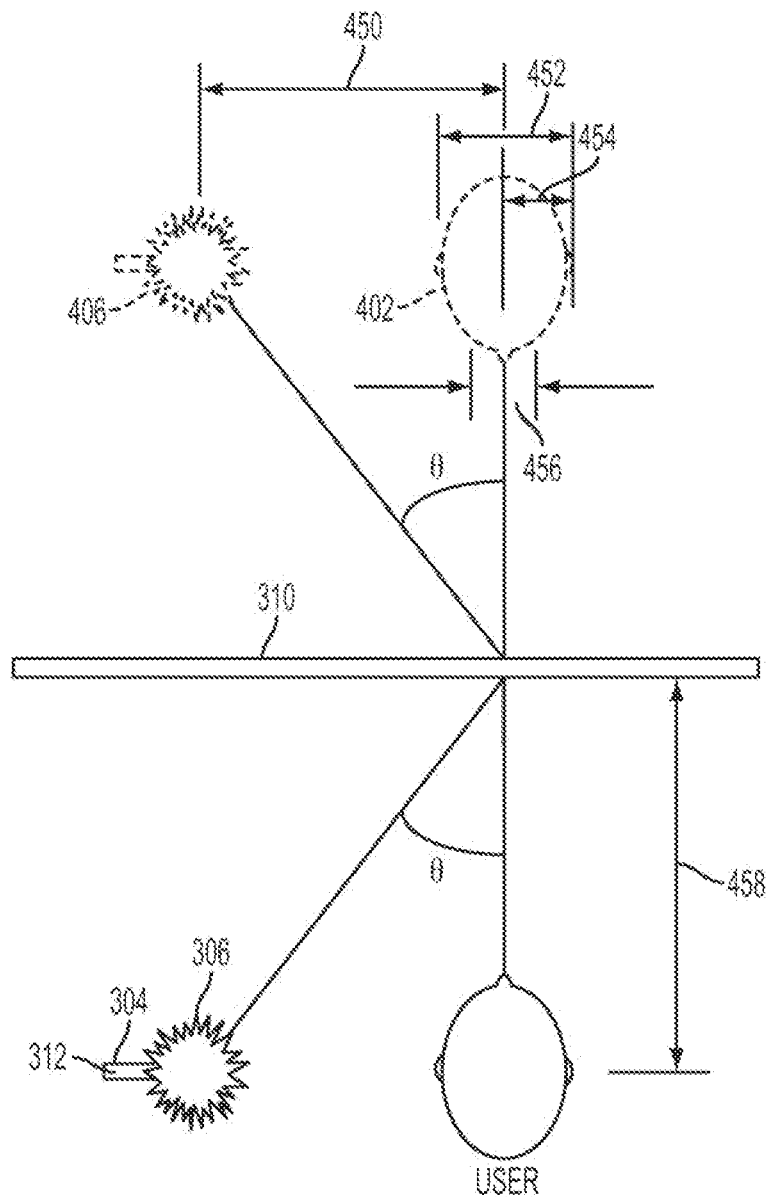

FIG. 4D shows an analysis technique for determining an angle of incidence (shown as "θ") of the light source 306. The angle θ may be compared to a stored angular value as part of the authentication process. In FIG. 4D a top view of the user device 304 capturing a user image 402 and reflected light source 406 is provided. In the illustrated embodiment, angle θ is function of a distance 450 (the distance between the reflected light source 406 and a center of the user image 402) and the distance 458 (the distance between the user/light source 306 and the reflective surface 310). The distance 450 may be orthogonal to distance 458. It is noted that while the light source 306 and the user are illustrated as being co-planar with the reflected surface 310, this disclosure is not so limited. In other words, in some implementations, the user may position the light source 306 either closer to the reflective surface 310 or further way from the reflected surface 310 relative to the user.

The distance 458 may be determined by the authentication computing system 100 based on an analysis of one or more facial dimensions (or ratios of dimensions) of the user image 402. For example, a head width dimension 452, an eye width dimension 456, and/or a nose-to-ear dimension 454 may be determined by any suitable image processing technique. In one embodiment, the user image 402 may be vectorized by the authentication computing system 100 as part of the image analysis processing. Once the dimension(s) (and/or ratios) are determined, they can be compared to known biometric data stored by the authentication computing system 100 in order to extrapolate the distance 458. The distance 450 can also be determined, for example, by image analysis of the image received by the authentication computing system 100.

Once distances 450 and 458 are determined, in one embodiment, the angle θ may be calculated based on Equations 1 and 2:

$$\operatorname{Tan}\theta = \frac{\text{Distance } 450}{\text{Distance } 458} \qquad \text{EQ. 1}$$

$$\theta = \operatorname{ArcTan}\frac{\text{Distance } 450}{\text{Distance } 458} \qquad \text{EQ. 2}$$

Once angle θ has been determined, it can then be compared to an angular value stored by the authentication computing system 100 as an authentication variable.

By way of example, an angular value of 30° may be stored by the authentication computing system 100. If the determined angle θ is in the range of 27° to 33°, for example, the flash angle may be deemed authenticated. It is to be appreciated that the acceptable range of angles may vary. In some embodiments, for example, the determined angle may be authenticated if it is within +/−25% of the stored angular value, while other embodiments may only permit authentication if the determined angle is within +/−1% of the stored angular value.

In some embodiments, real-time image analysis of the image feed from the camera 312 may be used during the image capture process. For example, the image feed may be analyzed to determine one or more facial dimensions (or ratios of dimensions) of the user image 402, such as the head width dimension 452 and the eye width dimension 456. When the dimensions are at a predetermined value (which may indicate the user is at a proper distance 458 from the reflective surface 310) the image may be automatically captured. As is to be appreciated, visual and/or audio cues can be provided to the user to assist with proper placement. Similar to above, the distance 450 may be determined by image analysis of the image received by the authentication computing system 100. Angle θ may then be determined using Equations 1 and 2, for example.

Figure 5B:
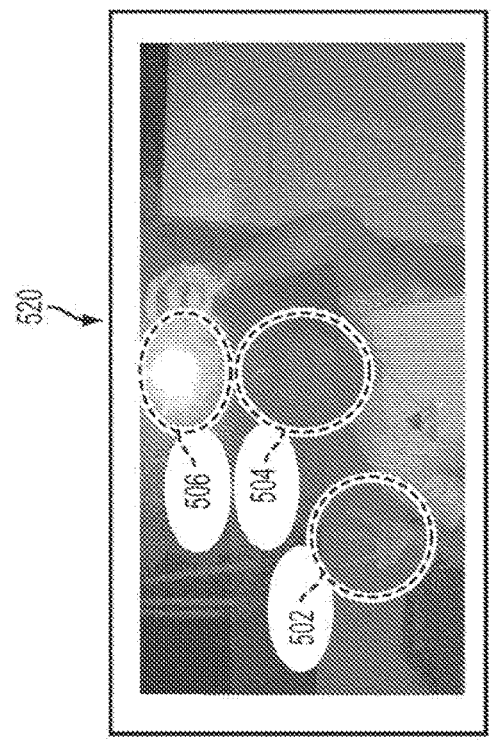
FIGS. 5A-5D show example images provided to an authentication computing system.
Figure 5D:
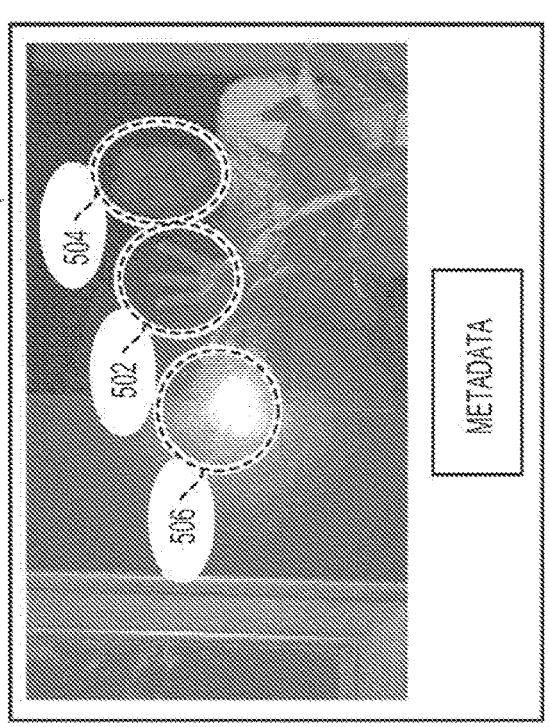
Figure 5A:
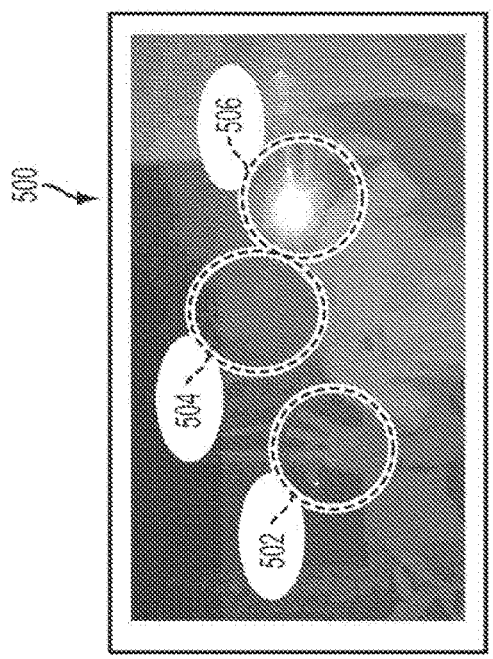
Figure 5C:
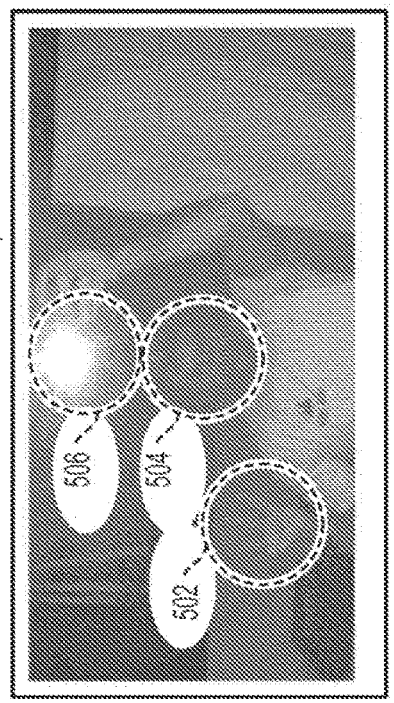

FIGS. 5A-5D show example images provided to an authentication computing system. Image 500 in FIG. 5A shows a user 504 holding a light source 506 at one position and a gesture 502 at another position. Images 500, 520, 540, and 560 illustrate the user 504, the light source 506, and the gesture 502 at other relative positions. As it to be appreciated, the features 504, the relative placement of the light source 506, the gesture 502, and the relative placement of the gesture relative to the user 504 and/or the light source 506 may be analyzed in accordance with the systems and methods described herein. It is noted that FIG. 5D illustrates that the image 560 may also include contextual data for processing by the authentication computing system. The contextual data may include device information, geographical location data, or other information which may be compared to expected contextual data stored by the system.

Figure 6:
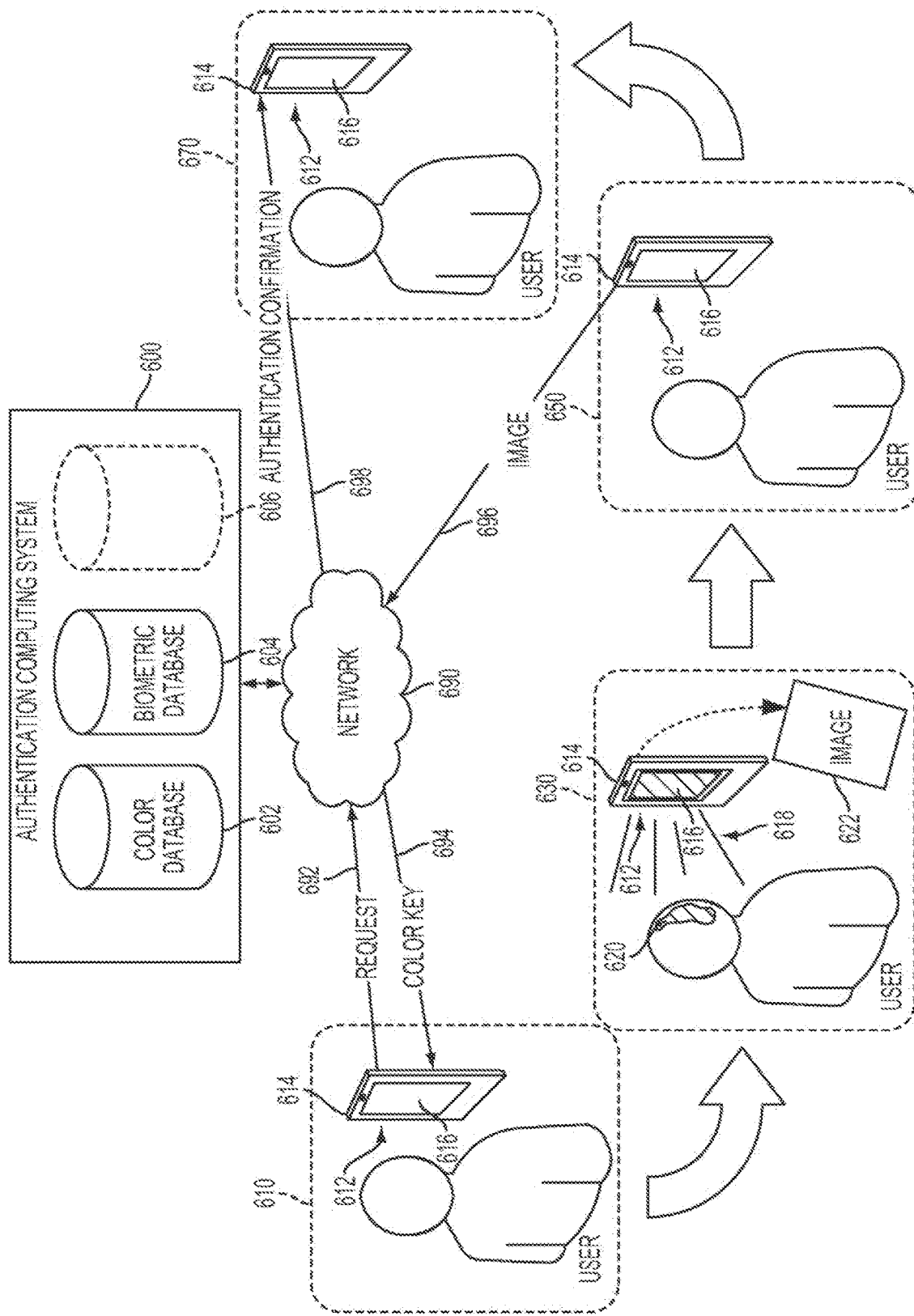
FIG. 6 shows a user authentication process in accordance with one non-limiting embodiment.

In some example embodiments, in addition or alternatively to the various authentication techniques described above, various authentication systems may perform a color signature analysis on the incoming image as part of the authentication process. FIG. 6 shows a user authentication process in accordance with one non-limiting embodiment. As shown at an event 610, a user is interacting with a computer device 612. The computing device 612 may be similar to user device 102 (FIG. 1) and may include a camera 614 and a graphical display 616. The computer device 612 may send a request 692 to an authentication module 600 through a communications network 690. The request 692 may be dispatched by an application running on the computing device 612. The request may include any information needed by the authentication module 600. The request may include, for example, a device ID or a user ID. Upon receipt of the request 692, the authentication computing system 600 may transmit a color key 694. The color key 694 may be stored in a color database 602. In various embodiments, the color key 694 may be in the form of a hex code or a decimal code, as shown in Table 1.

TABLE 1

COLOR CHART

| HTML name | Hex code R G B | Decimal code R G B |
|---|---|---|
| IndianRed | CD 5C 5C | 205 92 92 |
| LightCoral | F0 80 80 | 240 128 128 |
| Salmon | FA 80 72 | 250 128 114 |
| DarkSalmon | E9 96 7A | 233 150 122 |
| LightSalmon | FF A0 7A | 255 160 122 |
| Red | FF 00 00 | 255 0 0 |
| Crimson | DC 14 3C | 220 20 60 |
| FireBrick | B2 22 22 | 178 34 34 |
| DarkRed | 8B 00 00 | 139 0 0 |
| Pink | FF C0 CB | 255 192 203 |
| LightPink | FF B6 C1 | 255 182 193 |
| HotPink | FF 69 B4 | 255 105 180 |
| DeepPink | FF 14 93 | 255 20 147 |
| MediumVioletRed | C7 15 85 | 199 21 133 |
| PaleVioletRed | DB 70 93 | 219 112 147 |
| LightSalmon | FF A0 7A | 255 160 122 |
| Coral | FF 7F 50 | 255 127 80 |
| Tomato | FF 63 47 | 255 99 71 |
| OrangeRed | FF 45 00 | 255 69 0 |
| DarkOrange | FF 8C 00 | 255 140 0 |
| Orange | FF A5 00 | 255 165 0 |
| Gold | FF D7 00 | 255 215 0 |
| Yellow | FF FF 00 | 255 255 0 |
| LightYellow | FF FF E0 | 255 255 224 |
| LemonChiffon | FF FA CD | 255 250 205 |
| LightGoldenrodYellow | FA FA D2 | 250 250 210 |
| PapayaWhip | FF EF D5 | 255 239 213 |
| Moccasin | FF E4 B5 | 255 228 181 |
| PeachPuff | FF DA B9 | 255 218 185 |
| PaleGoldenrod | EE E8 AA | 238 232 170 |
| Khaki | F0 E6 8C | 240 230 140 |
| DarkKhaki | BD B7 6B | 189 183 107 |
| Lavender | E6 E6 FA | 230 230 250 |
| Thistle | D8 BF D8 | 216 191 216 |
| Plum | DD A0 DD | 221 160 221 |
| Violet | EE 82 EE | 238 130 238 |
| Orchid | DA 70 D6 | 218 112 214 |
| Fuchsia | FF 00 FF | 255 0 255 |
| Magenta | FF 00 FF | 255 0 255 |
| MediumOrchid | BA 55 D3 | 186 85 211 |
| MediumPurple | 93 70 DB | 147 112 219 |
| BlueViolet | 8A 2B E2 | 138 43 226 |
| DarkViolet | 94 00 D3 | 148 0 211 |
| DarkOrchid | 99 32 CC | 153 50 204 |

TABLE 1-continued

COLOR CHART

| HTML name | Hex code R G B | Decimal code R G B |
|---|---|---|
| DarkMagenta | 8B 00 8B | 139 0 139 |
| Purple | 80 00 80 | 128 0 128 |
| Indigo | 4B 00 82 | 75 0 130 |
| DarkSlateBlue | 48 3D 8B | 72 61 139 |
| SlateBlue | 6A 5A CD | 106 90 205 |
| MediumSlateBlue | 7B 68 EE | 123 104 238 |
| GreenYellow | AD FF 2F | 173 255 47 |
| Chartreuse | 7F FF 00 | 127 255 0 |
| LawnGreen | 7C FC 00 | 124 252 0 |
| Lime | 00 FF 00 | 0 255 0 |
| LimeGreen | 32 CD 32 | 50 205 50 |
| PaleGreen | 98 FB 98 | 152 251 152 |
| LightGreen | 90 EE 90 | 144 238 144 |
| MediumSpringGreen | 00 FA 9A | 0 250 154 |
| SpringGreen | 00 FF 7F | 0 255 127 |
| MediumSeaGreen | 3C B3 71 | 60 179 113 |
| SeaGreen | 2E 8B 57 | 46 139 87 |
| ForestGreen | 22 8B 22 | 34 139 34 |
| Green | 00 80 00 | 0 128 0 |
| DarkGreen | 00 64 00 | 0 100 0 |
| YellowGreen | 9A CD 32 | 154 205 50 |
| OliveDrab | 6B 8E 23 | 107 142 35 |
| Olive | 80 80 00 | 128 128 0 |
| DarkOliveGreen | 55 6B 2F | 85 107 47 |
| MediumAquamarine | 66 CD AA | 102 205 170 |
| DarkSeaGreen | 8F BC 8F | 143 188 143 |
| LightSeaGreen | 20 B2 AA | 32 178 170 |
| DarkCyan | 00 8B 8B | 0 139 139 |
| Teal | 00 80 80 | 0 128 128 |
| Aqua | 00 FF FF | 0 255 255 |
| Cyan | 00 FF FF | 0 255 255 |
| LightCyan | E0 FF FF | 224 255 255 |
| PaleTurquoise | AF EE EE | 175 238 238 |
| Aquamarine | 7F FF D4 | 127 255 212 |
| Turquoise | 40 E0 D0 | 64 224 208 |
| MediumTurquoise | 48 D1 CC | 72 209 204 |
| DarkTurquoise | 00 CE D1 | 0 206 209 |
| CadetBlue | 5F 9E A0 | 95 158 160 |
| SteelBlue | 46 82 B4 | 70 130 180 |
| LightSteelBlue | B0 C4 DE | 176 196 222 |
| PowderBlue | B0 E0 E6 | 176 224 230 |
| LightBlue | AD D8 E6 | 173 216 230 |
| SkyBlue | 87 CE EB | 135 206 235 |
| LightSkyBlue | 87 CE FA | 135 206 250 |
| Deep SkyBlue | 00 BF FF | 0 191 255 |
| DodgerBlue | 1E 90 FF | 30 144 255 |
| CornflowerBlue | 64 95 ED | 100 149 237 |
| RoyalBlue | 41 69 E1 | 65 105 225 |
| Blue | 00 00 FF | 0 0 255 |
| MediumBlue | 00 00 CD | 0 0 205 |
| DarkBlue | 00 00 8B | 0 0 139 |
| Navy | 00 00 80 | 0 0 128 |
| MidnightBlue | 19 19 70 | 25 25 112 |
| Cornsilk | FF F8 DC | 255 248 220 |
| BlanchedAlmond | FF EB CD | 255 235 205 |
| Bisque | FF E4 C4 | 255 228 196 |
| NavajoWhite | FF DE AD | 255 222 173 |
| Wheat | F5 DE B3 | 245 222 179 |
| BurlyWood | DE B8 87 | 222 184 135 |
| Tan | D2 B4 8C | 210 180 140 |
| RosyBrown | BC 8F 8F | 188 143 143 |
| SandyBrown | F4 A4 60 | 244 164 96 |
| Goldenrod | DA A5 20 | 218 165 32 |
| DarkGoldenrod | B8 86 0B | 184 134 11 |
| Peru | CD 85 3F | 205 133 63 |
| Chocolate | D2 69 1E | 210 105 30 |
| SaddleBrown | 8B 45 13 | 139 69 19 |
| Sienna | A0 52 2D | 160 82 45 |
| Brown | A5 2A 2A | 165 42 42 |
| Maroon | 80 00 00 | 128 0 0 |
| White | FF FF FF | 255 255 255 |
| Snow | FF FA FA | 255 250 250 |
| Honeydew | F0 FF F0 | 240 255 240 |
| MintCream | F5 FF FA | 245 255 250 |
| Azure | F0 FF FF | 240 255 255 |

TABLE 1-continued

COLOR CHART

| HTML name | Hex code<br>R G B | Decimal code<br>R G B |
|---|---|---|
| AliceBlue | F0 F8 FF | 240 248 255 |
| GhostWhite | F8 F8 FF | 248 248 255 |
| WhiteSmoke | F5 F5 F5 | 245 245 245 |
| Seashell | FF F5 EE | 255 245 238 |
| Beige | F5 F5 DC | 245 245 220 |
| OldLace | FD F5 E6 | 253 245 230 |
| FloralWhite | FF FA F0 | 255 250 240 |
| Ivory | FF FF F0 | 255 255 240 |
| AntiqueWhite | FA EB D7 | 250 235 215 |
| Linen | FA F0 E6 | 250 240 230 |
| LavenderBlush | FF F0 F5 | 255 240 245 |
| MistyRose | FF E4 E1 | 255 228 225 |
| Gainsboro | DC DC DC | 220 220 220 |
| LightGrey | D3 D3 D3 | 211 211 211 |
| Silver | C0 C0 C0 | 192 192 192 |
| DarkGray | A9 A9 A9 | 169 169 169 |
| Gray | 80 80 80 | 128 128 128 |
| DimGray | 69 69 69 | 105 105 105 |
| LightSlateGray | 77 88 99 | 119 136 153 |
| SlateGray | 70 80 90 | 112 128 144 |
| DarkSlateGray | 2F 4F 4F | 47 79 79 |
| Black | 00 00 00 | 0 0 0 |

At event 630, the computing device 612 may output the color on the graphical display 616. The user can then position themselves proximate the graphical display 616 so that the color 618 is reflected off the user's feature as a color signature 620. In some embodiments, the user positions themselves within about 12 inches of the graphical display 616. The computer device 612 may then capture an image 622 of the user with accompanying color signature 620 using the camera 614. As is to be appreciated, while not illustrated in FIG. 6, the user may also make a gesture that could be captured by the camera 614. Furthermore, the graphical display 616 may be caused to sequentially display a plurality of different colors, such as to provide a color-keyed strobe affect, as described herein.

At event 650, the image 622 is sent to the authentication computing system 600, as illustrated by image upload 696. The image 622 may be encrypted using any suitable encryption scheme. Upon receipt, the authentication computing system 600 may perform various analytic processes on the image. For example, the authentication computing system 600 may perform a color analysis on the color signature 620 to confirm the proper color is present in the image and that it is properly reflected off the user. Furthermore, biometric analysis techniques may also be performed to the image received to confirm the identity of the user. Biometric information may be stored in a biometric database 604. As is to be appreciated, a gesture present in the image could also be analyzed by the authentication computing system as part of the authentication process. As is to be appreciated, the authentication computing system 600 may comprise a variety of databases 606 relevant to the authentication process. For example, in some embodiments, one or more databases 606 may store gesture-related information. Database 606 may also store various device specific variables, such as machine IDs. Database 606 (or other associated databases) may also various authentication variables, such as flash angle variables, user device angle variables, shutter/flash synchronicity variables, and so forth.

At event 670, an authentication confirmation 698 is sent to the computing device 612. Upon receipt of the authentication confirmation, an application, or other gatekeeper on the computing device, could allow the user access to the desired destination.

In some embodiments, a moving image scan may be utilized for authentication purposes. The moving image scan (sometimes referred to herein as a rotary scan) can generate image data that is recorded as a video file or can generate image data that is a series of still images. The image data may be obtained as a user moves a user device in a particular path in space proximate to the user's body. The particular path may be chosen so that image data regarding a user's body is collected from many different angles so that it may be analyzed as part of the authentication process. In one embodiment, the particular path is generally arc-shaped and circumnavigates at least a portion of a user's head or upper torso. In some embodiments, instead of moving the user device, the user may move in a predetermined path while the camera on the user device remains relatively still. For example, the user may slowly sweep or swivel their head side to side as image data is collected by a relatively stationary camera. The camera (such as a camera on a user device), may be held in the hand of a user or positioned on a stationary object, for example.

In addition to image data, additional contextual data may be collected during the moving image scan and provided to the authentication computing system as part of authentication processes utilizing "man and machine" binding. The contextual data may be collected by sensors that are onboard the user device, such as gyroscopes, accelerometers, and electromagnetic field meters, for example. This contextual data may be used by the authentication computing system to determine whether parameters associated with the predetermined path are within a particular range. For example, for proper authentication, a user may need to move the user device at a speed of about 2 ft/sec in a counter-clockwise direction, while the user device held at about a 45 degree angle. Information that may be used to determine if these requirements are satisfied may be provided as contextual data that is sent with image data to the authentication computing system. Furthermore, measurements related to electromagnetic fields may be included with the contextual data and be used to confirm that the user started and ended the path at the proper positions.

Figure 7A:
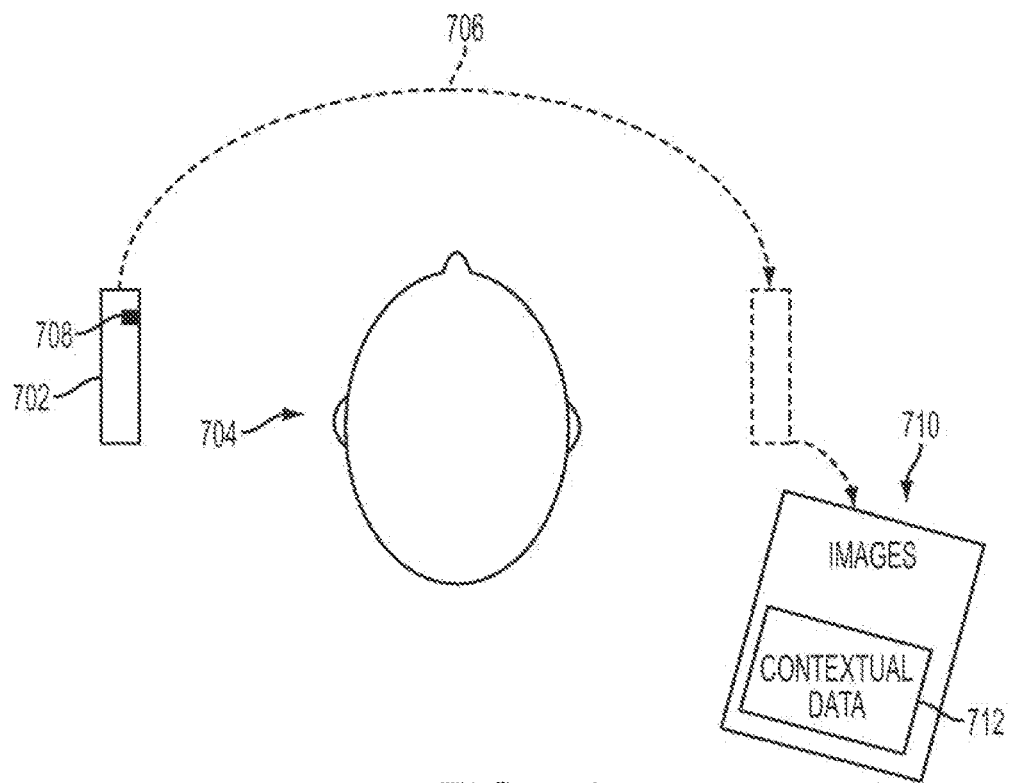
FIGS. 7A-7B depict example moving image scans.
Figure 7B:
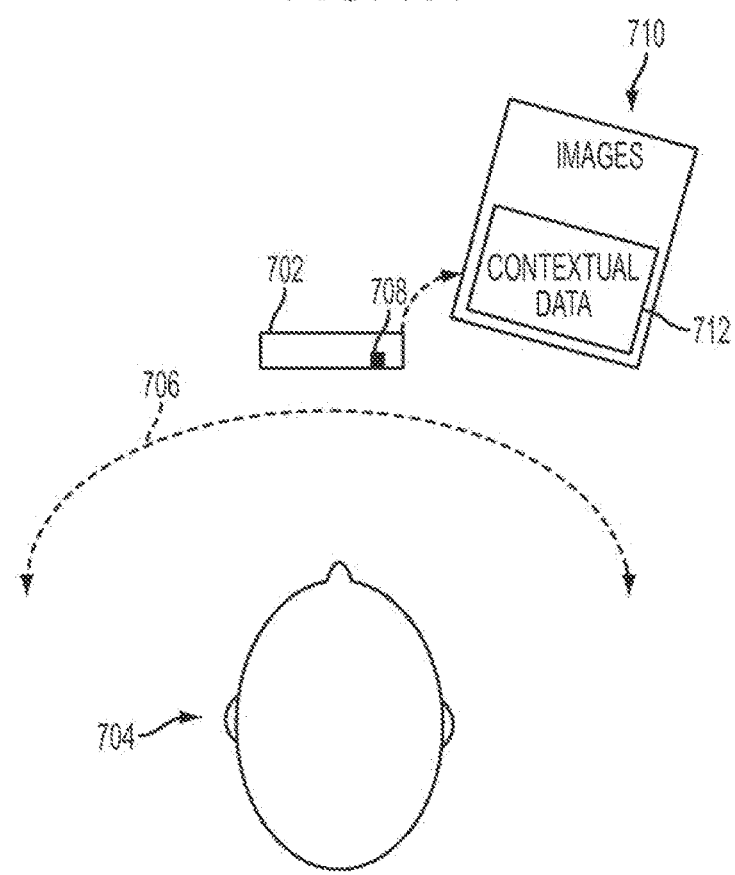

FIG. 7A depicts an example moving image scan in accordance with one non-limiting embodiment. A user device 702 includes an onboard camera 708 that may collect video and/or still images. As part of an authentication process the user 704 sweeps the user device 702 in a path 706 while the camera 708 collects image data. While the path 706 is shown as an arc, a variety of paths may be used, such as saw-tooth paths, v-shaped paths, linear paths, and so forth. FIG. 7B depicts an example moving image scan where the user 704 sweeps their head side to side in a path 706 while the camera 708 collects the image data. In other embodiments, the user may be required to nod their head up and down, move their head in a circular pattern, or otherwise execute a particular head and/or body movement. In any event, during or subsequent to the sweep, images 710 may be provided to an authentication computing system, such as the authentication computing system 100 shown in FIG. 1. The images 710 may include contextual data 712, which may include speed data, orientation data, machine ID, GPS data, and so forth. The images 710 and the contextual data 712 may be transmitted to the authentication computing system in an encrypted network packet, similar to the encrypted network packet 106 shown in FIG. 1. The authentication computing system can analyze the images 710 and the contextual data 712 to determine if the user 704 should be authenticated. For example, the images 710 may be compared to images in a baseline image database 124 (FIG. 1).

Figure 7C:
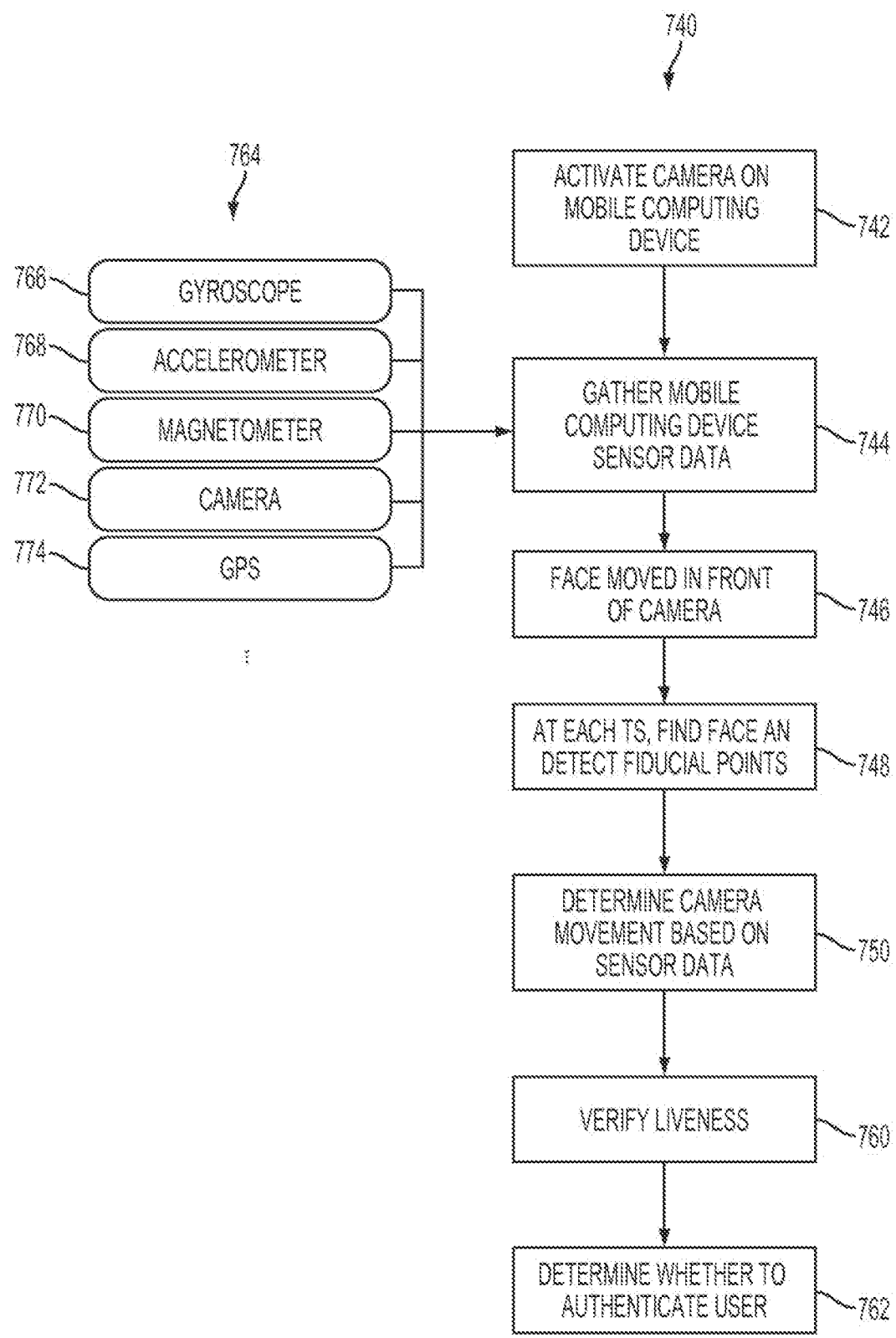
FIG. 7C illustrate an example process flow associated with a moving image scan.

FIG. 7C depicts an example process flow 740 associated with a moving image scan. At 742, a camera is activated on a user device, such as a mobile computing device. At 744, sensor data from the mobile computing device is gathered. While a wide variety of sensor data can be gathered from the mobile computing device, example sensors 764 include, without limitation, a gyroscope 766, an accelerometer 768, a magnetometer 770, a camera 772, a GPS 774, among others. As described herein, in some embodiments the particular sensor data that is utilized by the process flow 740 may be based, at least in part, on the availability of resources, such as network bandwidth and battery power, for example. In any event, at 746 a face is moved in front of the camera, such as by sweeping the camera in front of the face (similar to the moving image scan described in FIG. 7A, for example). During the moving image scan, at time periods "Ts", the mobile computing device can find the face in the image and detect various fiducial points, as shown at 748. Time period Ts can be any suitable period of time, such as 0.03125 seconds (i.e., 32 frames/second), 0.1 seconds, 0.5 seconds, and so forth. As is to be appreciated, as the interval Ts is shortened, the needed bandwidth may increase. Example fiducial points include eye locations, nose location, ear locations, facial measurements, and the like. At 750, camera movement is detected, by way of the sensor data gathered by the mobile computing device. Camera movement may be detected at intervals Ts. By way of the determined camera movement, it is can determined if the camera was moved by the user in the expected path. At 760, liveness of the user is detected. In one embodiment, liveness is confirmed based on changes of the face in the image matching the angular movements as detected by the sensors. Basing the determination off of angular movements can mitigate attempted spoofing by using a 2-dimensional image of a user. At 762, it is determined whether to authenticate user. Such determination may be made, for example, after a sufficient number of intervals Ts have elapsed, such as 5 intervals, 10 intervals, 20 intervals, 100 intervals, or 160 intervals, for example.

Figure 8A:
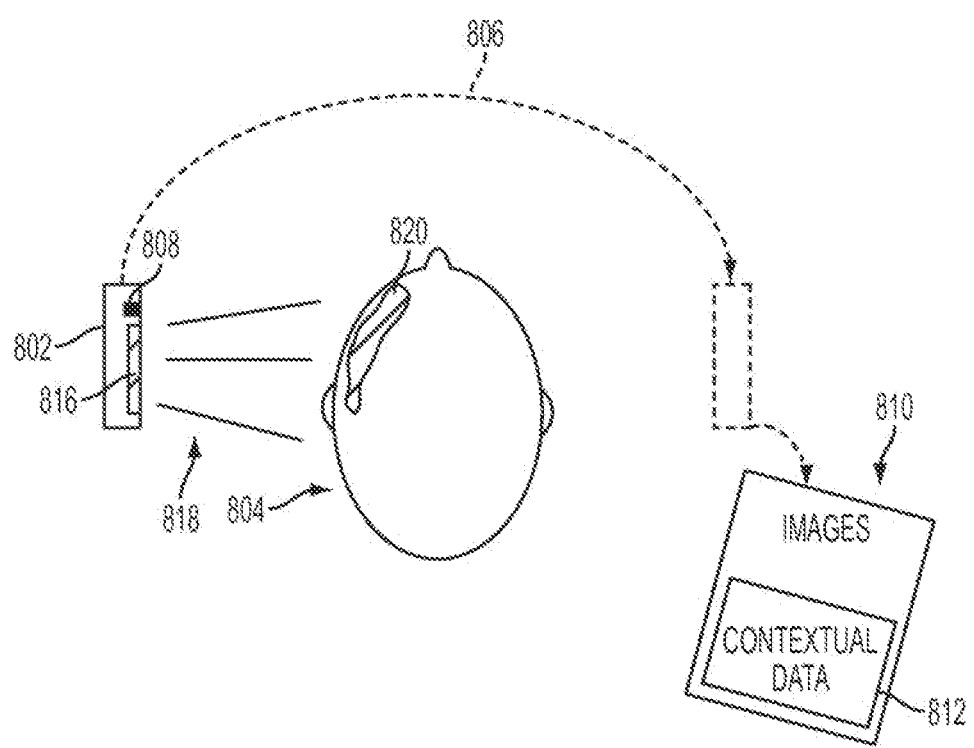
FIG. 8A illustrates an example moving image scan.

FIG. 8A depicts another example of an authentication process utilizing a moving image scan. The illustrated authentication process includes the use of a color signature, which is described above with regard to FIG. 6. A user device 802 includes a graphical display 816 and an onboard camera 808 that may collect video and/or still images. As part of an authentication process, the graphical display 816 projects a particular color 818, which may be reflected off the facial features of the user 804 as a color signature 820, as described above. The user 804 sweeps the user device 802 in a path 806 while the camera 808 collects image data, which includes the color signature 820. During or subsequent to the sweep, images 810 may be provided to an authentication computing system, such as the authentication computing system 100 shown in FIG. 1. The images 810 may include contextual data 812, as described above with regard to contextual data 712. The authentication computing system may analyze the images 810 and the contextual data 812 to determine if the user 804 should be authenticated.

Figure 8B:
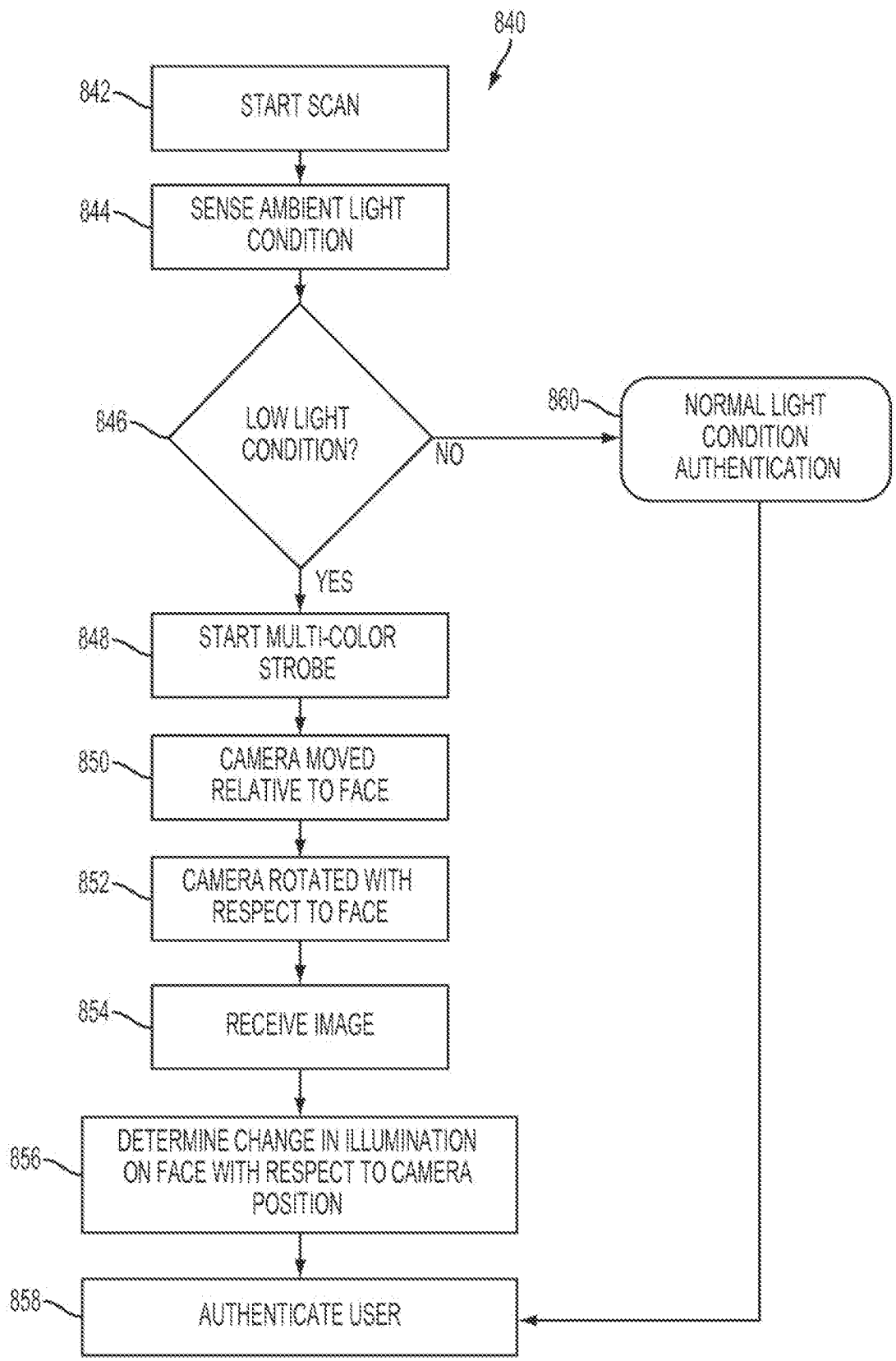
FIG. 8B illustrates an example process flow associated with a moving image scan utilizing multi-colored strobing.

FIG. 8B illustrates an example process flow 840 associated with a moving image scan utilizing multi-colored strobing. At 842, a scan is started. The scan may be generally similar to the moving image scan described with regard to FIG. 8A. At 844, an ambient light condition is sensed. Such condition may be sensed using an ambient light sensor onboard the user device 802 (FIG. 8A). If there is adequate ambient lighting to collect biometric data, the process can continued to execute authentication under normal light conditions, as shown at 860. If a low light condition exists (i.e., under a threshold lux level), the authentication process may utilize a multi-colored strobe technique to gather biometric data from the user. At 848, a multi-color strobe is activated by successively displaying different colors on a display of the user device 801. In one embodiment, one of seven colors is blinked twice on the screen. The color may be displayed on the display for a particular time period, such as Ts, described above. The periodic color strobe and the periodic collection of the image data may be coordinated so that image data is collected at times when the display is illuminated with a particular color. At 850, the camera is moved relative to a face. At 852, the camera is rotated with respect to the face such that images of the face at a plurality of different angular vantages can be collected. At 854, an image is received 854. As the color changes after Ts, additional images can be collected at 854. At 856, the illumination on the face with respect to both the angular position (as determined by sensor data) and the color data is determined. At 858, authentication is determined using biometric data, illumination data, and any other contextual data, such as geolocational information, machine ID, and so forth.

The data collected from the image scan using the strobing colors may not be sufficient to satisfy an authentication threshold. In some embodiments, a communication feedback loop between the authentication computing system and the user may be used to obtain the user's observations during the scan. For example, if the facial recognition data is not sufficient to authenticate the user, the authentication computing system can send an electronic communication to the user device. The electronic communication can be in any suitable format, such as a SMS text message, an email message, an "in-application" message, a messenger message, and so forth. The electronic communication can ask the user to identify the color or colors they saw on the screen during the attempted authentication. The user can reply with the color using any suitable messaging technique, such as a reply SMS message, for example. If the user's observation of the color data matches the color that was, in fact, blinked on the screed on the user device, the authentication computing system can use that observation to qualify the user. Accordingly, using this techniques, there generally two observers in the authentication process. The authentication computing system observes the illumination data reflected off the skin of a user by way of the image gathering process and the user observes the color that is displayed on the display of the user device.

Figure 9:
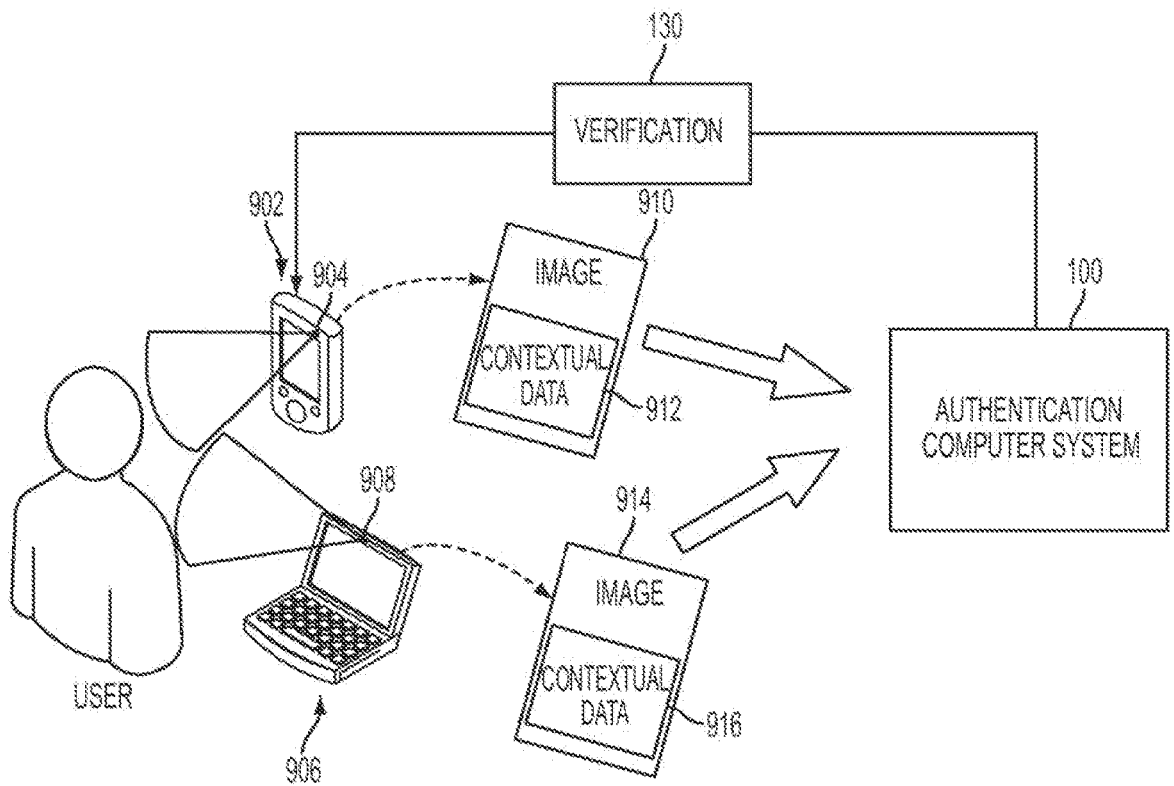
FIGS. 9-10 illustrate example authentication processes utilizing multi-image acquisition processes.

In some embodiments, the authentication may include acquisition of images from a plurality of devices in either a sequential or concurrent image collection process. For example, for proper authentication, a handheld mobile device may need to collect a first image of a user and a laptop computer (or other computing device), collects a second image of the user. In other embodiments, a different collection of computing devices may be used to collect the images, such as a mobile device and a wall-mounted unit, for example. FIG. 9 illustrates an authentication process utilizing a multi-image acquisition process in accordance with one non-limiting embodiment. A user is positioned proximate to a first user device (shown as a smart phone) having a camera 904. The user is also positioned proximate to a second user device 906 (shown as a laptop) having a camera 908. While two user devices are illustrated in FIG. 9, some embodiments may utilize three more or more user devices.

In any event, the first user device 902 collects first image 910 and the second user device collects second image 914. The first image 910 and the second image 914 may be collected at generally the same time or they may be collected sequentially. Each image 910, 914 may include associated contextual data 912, 916. The images 910, 914 may be provided to the authentication computing system 100 for processing. As shown, verification 130 may be provided to the first user device 902 if the authentication computing system 100 to indicate a successful authentication of the user. It is noted that while the verification 130 is shown being delivered to the first user device 902, the verification 130 may additionally or alternatively be delivered to the second user device 906.

Figure 10:
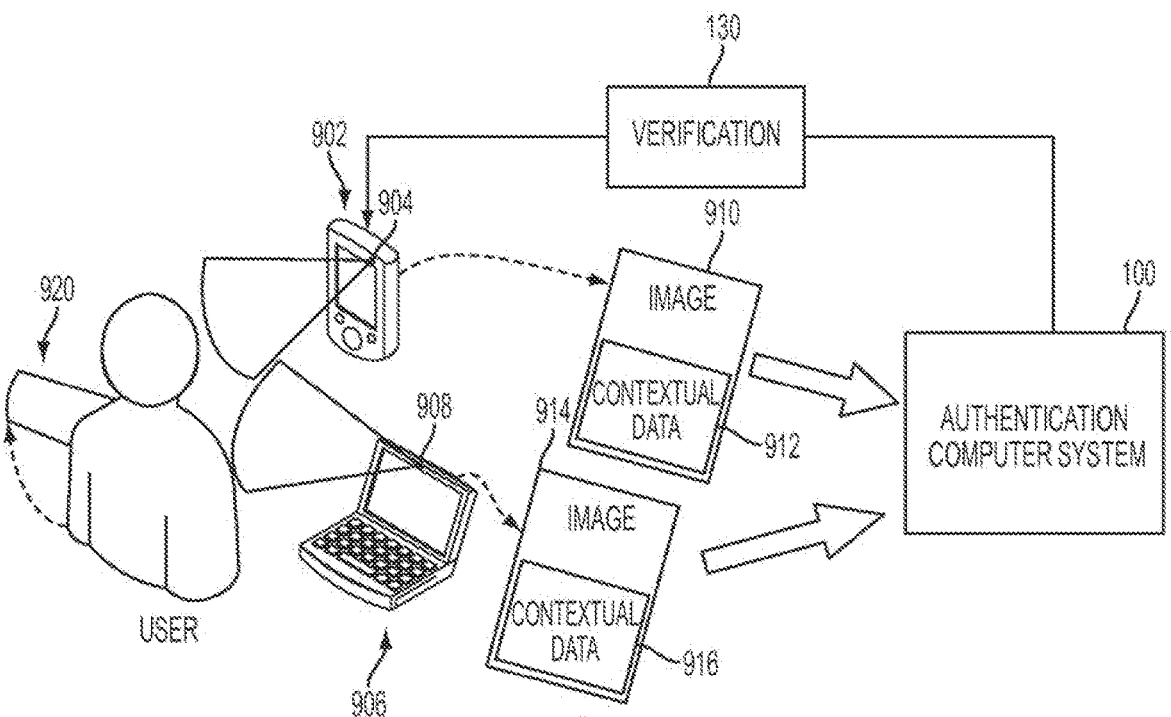

FIG. 10 illustrates an authentication process utilizes multi-image acquisition process in accordance with another one non-limiting embodiment. The authentication process is generally similar to the process shown in FIG. 9. In FIG. 10, however, user movement 920 is required as part of the authentication process. Such movement may be used to aid in thwarting spoofing techniques. In some embodiments, the particular movement required of the user may be identified during the authentication process. For example, the first image 910 may be collected with the user at a first position. The user may then be instructed by one of the first and second user devices 904, 906 to perform a certain movement, such as raise an arm. The second image 914 may then be collected and analyzed by the authentication computing system 100 to confirm the user successfully completed the requested movement.

Various systems and methods described herein may generally provide resource aware mobile computing. Examples of resources that can be considered include, without limitation, network bandwidth, batter power, application settings, and the like. Based on the particular availability of the resources at the time of authentication, the system may change the type of biometric data collected and transmitted, the type of contextual data collected and transmitted, or change other authentication parameters. During periods of relatively high resource availability, the system can use authentication techniques that utilize large amount of resources, such as bandwidth, battery power, and the like. During periods of relatively low resource availability, the system can use authentication techniques that do not necessarily utilize large amount of resources. In some embodiments, authentication procedures, or at least some of the authentication procedures, may be performed local to the computing device by a local authentication computing system. The amount or portion of the authentication process performed local to the computing device compared to the amount or portion of the authentication process performed remotely (such as by authentication computing system 100), may be based on available resources, including environmental and/or operational factors.

Example factors may include, without limitation, power source strength, available data transmission rates, available image processing ability, type of network connections available (i.e., cellular vs. WiFi), and so forth. Thus, resource-aware decision making may be used to determine which part of the authentication process is performed locally and which part of the authentication process is performed remotely. In some embodiments, the system attempts to perform the entire authentication process local to the user device. Such approach may be aimed to conserve bandwidth and/or to minimize communications over a network. If the user cannot be properly authenticated, communications with a remote authentication computing system may be utilized in an attempt to complete the authentication request. In some embodiments, if the battery supply of the client device is beneath a certain threshold, a majority of the authentication process is offloaded to the remote authentication computing system. Moreover, the number of authentication variables considered, or the types of authentication variables considered during the authentication process may be dependent on the environmental and/or operational factors. For example, during periods of high data connectivity and/or high-battery strength, the authentication computing system may require the user device to supply a relatively high number of authentication variables and/or resource intensive variables. During periods of low data connectivity and/or low battery strength, the authentication computing system may determine that a subset of authentication variables are suitable for authentication based on the operational conditions and request a limited number of authentication variables from the user device. In some embodiments, when the user device resumes high data connectivity and/or high battery strength, the authentication computing system may require the user to re-authenticate using additional authentication variables.

Figure 11:
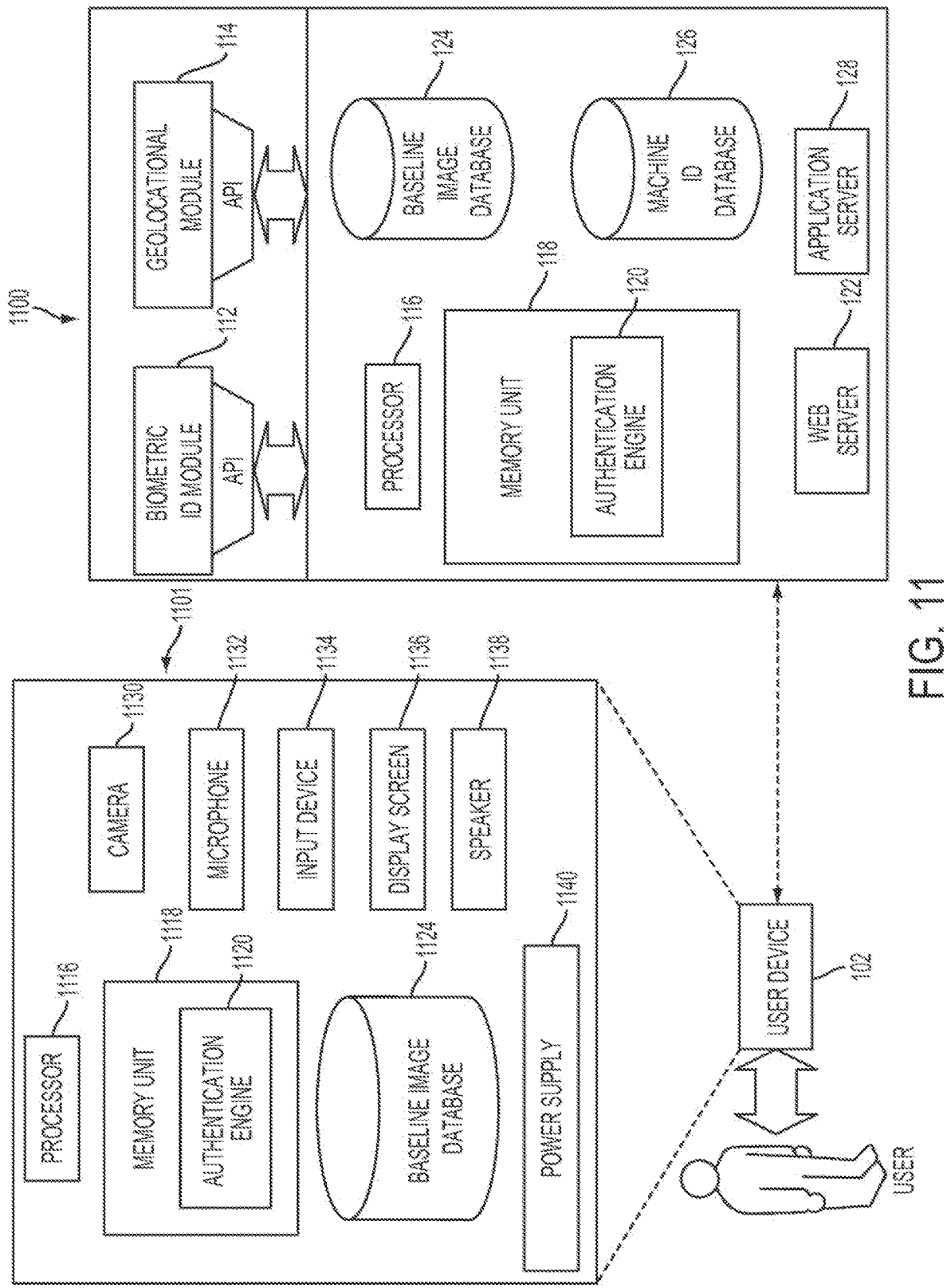
FIG. 11 illustrates an authentication computing system that comprises a local authentication computing system and a remote authentication computing system.

FIG. 11 illustrates an authentication computing system that comprises a local authentication computing system 1101 and a remote authentication computing system 1100. In the illustrated embodiment the remote authentication computing system 1100 comprises the elements of the authentication computing system 100 described above with regard to FIG. 1. The local authentication computing system 1101 is executed on a user device 102. The local authentication computing system 1100 may include a variety of modules or components for authenticating a user of the user device 102. For example, the local authentication computing system 1100 may comprise one or more processors 1116 and one or more computer memory units 1118. For convenience, only one processor 1116 and only one memory unit 1118 are shown in FIG. 11. In some embodiments, for example, the user device 102 includes a graphics processing unit (GPU). The processor 1116 may execute software instructions stored on the memory unit 1118. The processor 1116 may be implemented as an integrated circuit (IC) having one or multiple cores. The memory unit 1118 may include volatile and/or non-volatile memory units. Volatile memory units may include random access memory (RAM), for example. Non-volatile memory units may include read only memory (ROM), for example, as well as mechanical non-volatile memory systems, such as, for example, a hard disk drive, an optical disk drive, etc. The RAM and/or ROM memory units may be implemented as discrete memory ICs, for example.

The memory unit 1118 may store executable software and data for authentication engine 1120. When the processor 1116 of the local authentication computing system 1101 executes the software of the authentication engine 1120, the processor 1116 may be caused to perform the various operations of the local authentication computing system 1101, such as send information to remote computer devices, process information received from remote computer devices, and provide verification information regarding user authentication to applications executing on the user device 102. Data used by the authentication engine 1120 may be from various sources, either local or remote, such as a baseline image database 1124 and/or baseline image database 124. The data stored in the baseline image database 1124 may be stored in a non-volatile computer memory, such as a hard disk drive, a read only memory (e.g., a ROM IC), or other types of non-volatile memory.

The user device 102 in the illustrated embodiment also comprises various components, such as a camera 1130, a microphone 1132, an input device 1134, a display screen 1136, a speaker 1138, and a power supply 1140. As is to be readily appreciated, other types of user device may have different components as those illustrated in FIG. 11. In any event, the user may interact with various components during an authentication process. Depending on the available resources, the authentication engine 1120 may determine whether to perform some or all of the authentication process, or to offload some of all of the authentication process to the remote authentication computing system 1100. For example, if the available power in the power supply 1140 is relatively low, the user device 1101 may offload much of the authentication processing to the remote authentication computing system 1100. In another example, if the data connection to the remote authentication computing system 1100 is unstable, of low quality, or non-existent, the user device 1101 may perform much of the authentication processing using the local authentication computing system 1101.

Figure 12:
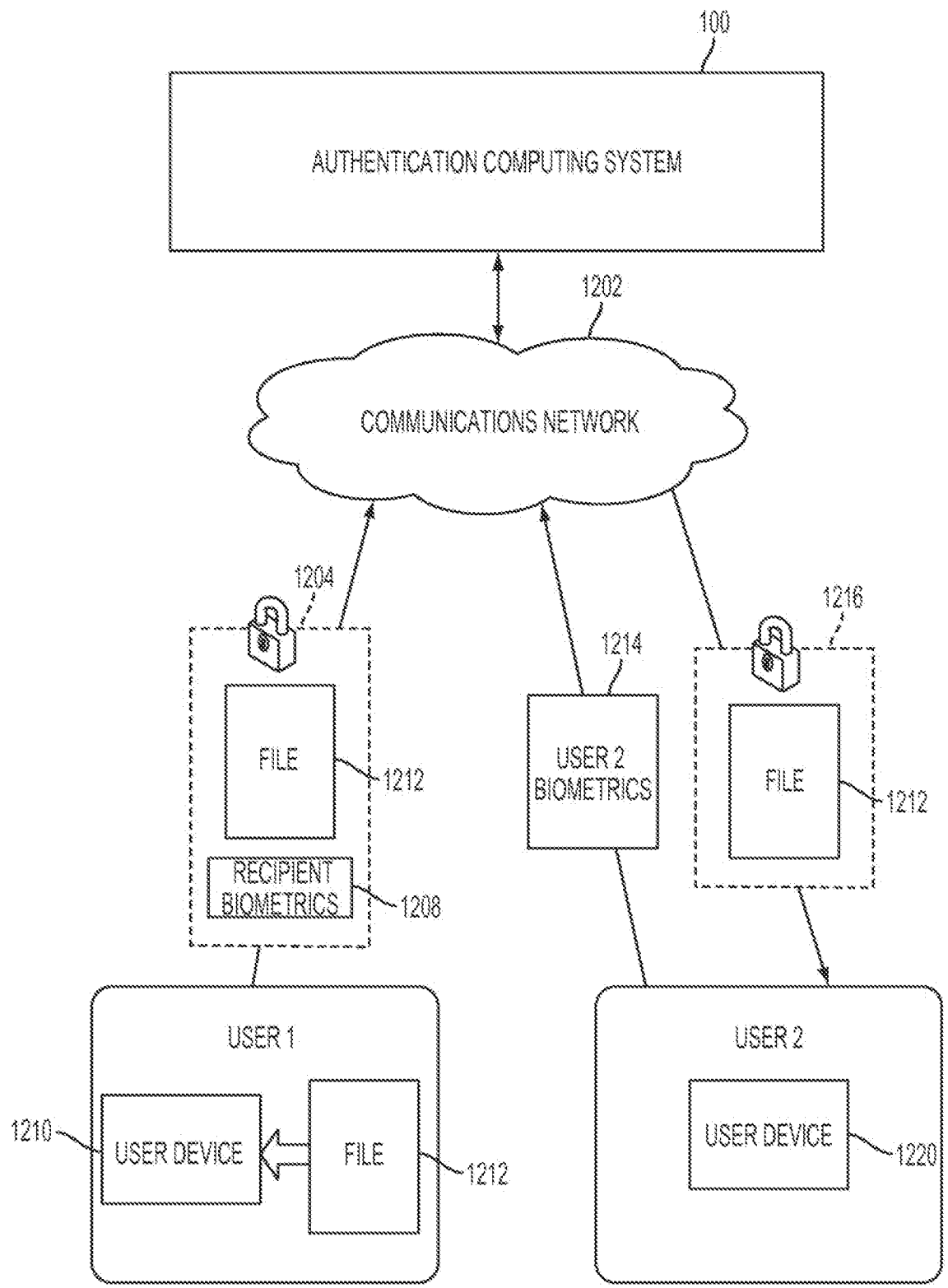
FIG. 12 illustrates an example data transferring technique utilizing an authentication computing system.

FIG. 12 illustrates an example data transferring technique utilizing an authentication computing system. In the illustrated embodiment, the authentication computer system 100 illustrated in FIG. 1 is utilized. A first user (illustrated at User 1) determines which file 1212 to transmit using a user device 1210. The file 1212 may be any suitable type of electronic data file, such as a document file, an image file, a video file, or any other type of computer storable data. The first user may send an encrypted packet 1204 through a communications network 1202, such as a public network (i.e., the Internet), to the authentication computing system 100. The encrypted packet 1204 may include the file 1212 and recipient biometrics 1208. In one embodiment, the recipient biometrics 1208 includes an image of the recipient.

In other embodiments, the recipient biometrics 1208 includes a recipient fingerprint, a recipient retina scan, or other recipient biometric identifier. In the illustrated embodiment, the second user (illustrated as User 2) is the intended recipient of the file 1212. Prior to being given access to the file 1212, the second user provides the user 2 biometrics 1214 to the authentication computing system 100. Such user 2 biometrics 1214 may include, for example, an image of the second user obtained using a camera (not shown) of the user device 1220. When the user 2 biometrics 1214 are deemed to match the recipient biometrics 1208, or at least satisfy a confidence threshold, that were originally provided by the first user, an encrypted packet 1216 may be delivered to the user device 1220 of the second user. The encrypted packet 1216 may include the file 1212.

While FIG. 12 illustrates a one-to-one file sharing scenario, other sharing scenarios may be facilitated by the authentication computing system 100, such as a one-to-many file sharing scenario. In such scenarios, user 1 may provide recipient biometrics 1208 for each of a plurality of recipients, such as a group of N recipients. When the file 1212 is encrypted, as described above, biometrics from all of the plurality of recipients may be used. Subsequently, when a user seeks access to the encrypted file 1212, the authentication computing system 100 may determine if the biometrics of the user seeking access to the file matches any one of the recipient biometrics 1208 provided by user 1. The authentication computing system 100 may also utilized contextual data received from the user seeking access to the file, as described herein.

In yet another embodiment one-to-many sharing scenario, such as for high security type implementations, a certain number of recipients must concurrently access the encrypted file 1212 at the same time, or at least nearly at the same time, in order for the collective group to gain access to the encrypted file. Such techniques may seek to ensure that certain files are accessed only in presence of other people. By way of example, user 1 may identify the biometrics of N recipients that may access the file 1212, where N>1. User 1 may also identify a threshold number k, where k=1 ... N. Here, k is the number of recipients that must each provide individual biometrics before the file is decrypted so that the file may be accessed by the group of k recipients. The value for k can be any suitable number, and may vary based on implementation, the desired level of security, or any other factors. In some embodiment, k is set by the authentication computing system 100 based on the number N of recipients such that k is a majority of N, for example. In some embodiments, k is 20% of N, rounded to the nearest integer, and so forth. Furthermore, in addition to having the requisite number of recipients providing biometrics, the authentication computing system 100 may also process contextual data associated with each recipient for an additional layer of security.

Figures 13, 14:
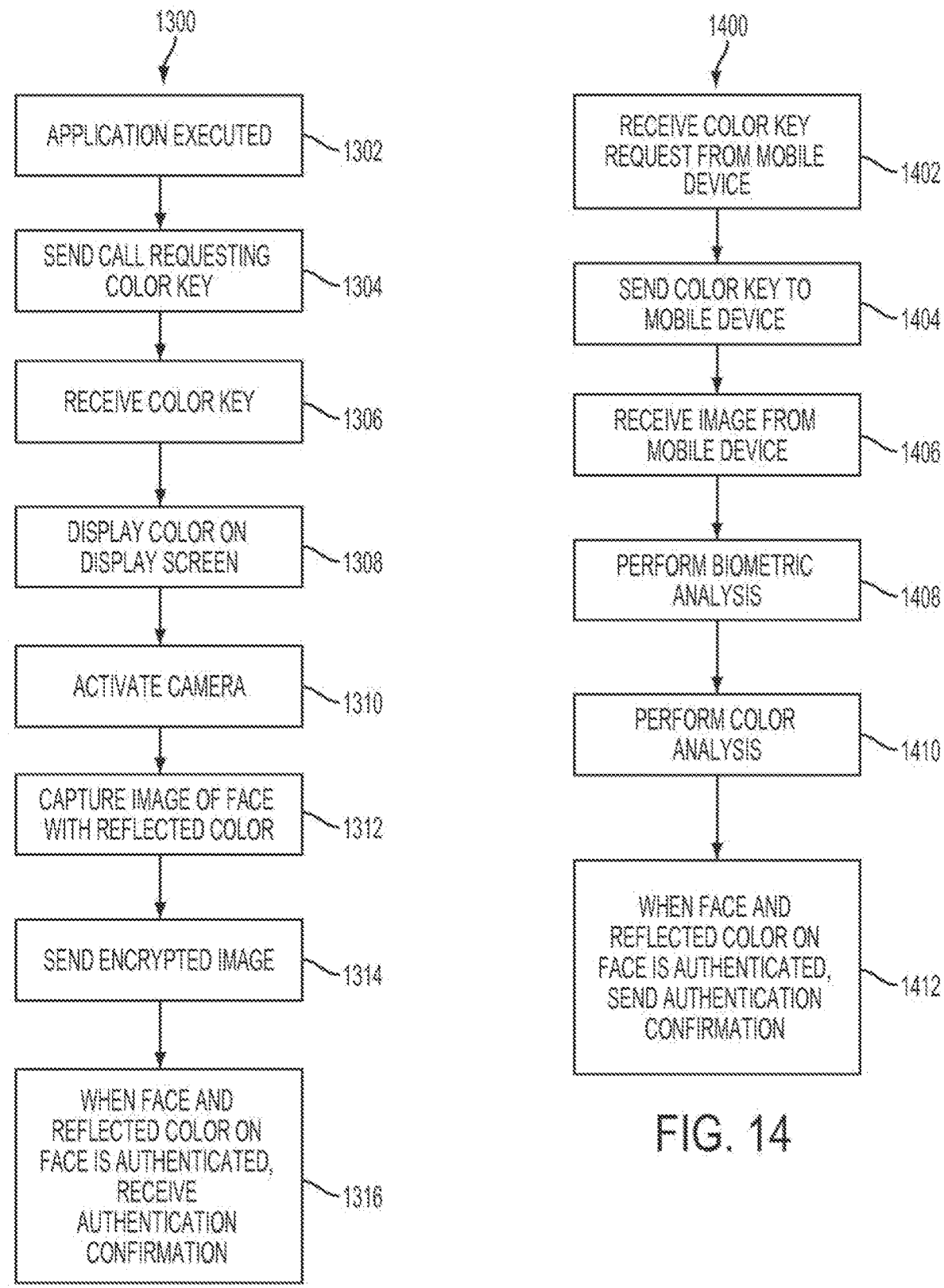
FIG. 13 illustrates an authentication process for a computing device using a color signature in accordance with one non-limiting embodiment.
FIG. 14 illustrates an authentication process for an authentication computing system using a color signature in accordance with one non-limiting embodiment

FIG. 13 illustrates an authentication process 1300 for a computing device using a color signature in accordance with one non-limiting embodiment. At block 1302, an application is executed. The application may be executed on a user device 102 (FIG. 1), for example. At block 1304, the application sends a call requesting a color key. The call may include various identification data. At block 1306, the color key is received. The color key may be in the form of a hex color code. At block 1308, the color is displayed on the display screen of the user device. At block 1310, a camera is activated. The camera may be integral or may be a standalone camera (such as a web cam, for example). At block 1312, an image is captured. The image may be of the face of the user with the color reflecting off the face as a color signature. At block 1314, the image may be cryptographically sent to an authentication computing system. At block 1316, an authentication confirmation is received when the face and the color signature is authenticated.

FIG. 14 illustrates an authentication process 1400 for an authentication computing system using a color signature in accordance with one non-limiting embodiment. At block 1402, a color key is requested from a mobile device. In some example embodiments, the request may be received from other types of devices, such as building access devices or desktop computers, for example. At block 1404, a particular color key is sent to the mobile device. At block 1406, an image is received from the mobile device. At block 1408, the biometric components of the image are analyzed. In some example embodiments, this analysis is performed by a third party biometric analytics service. At block 1410, color analysis is performed on a color signature of the image. In particular, the color signature can be analyzed to confirm it matches the signature for a particular user and that it is the same color as the color key originally sent to the mobile device. At block 1412, an authentication confirmation is sent to the mobile device when the face and the color signature is authenticated.

Figures 15, 16, 17:
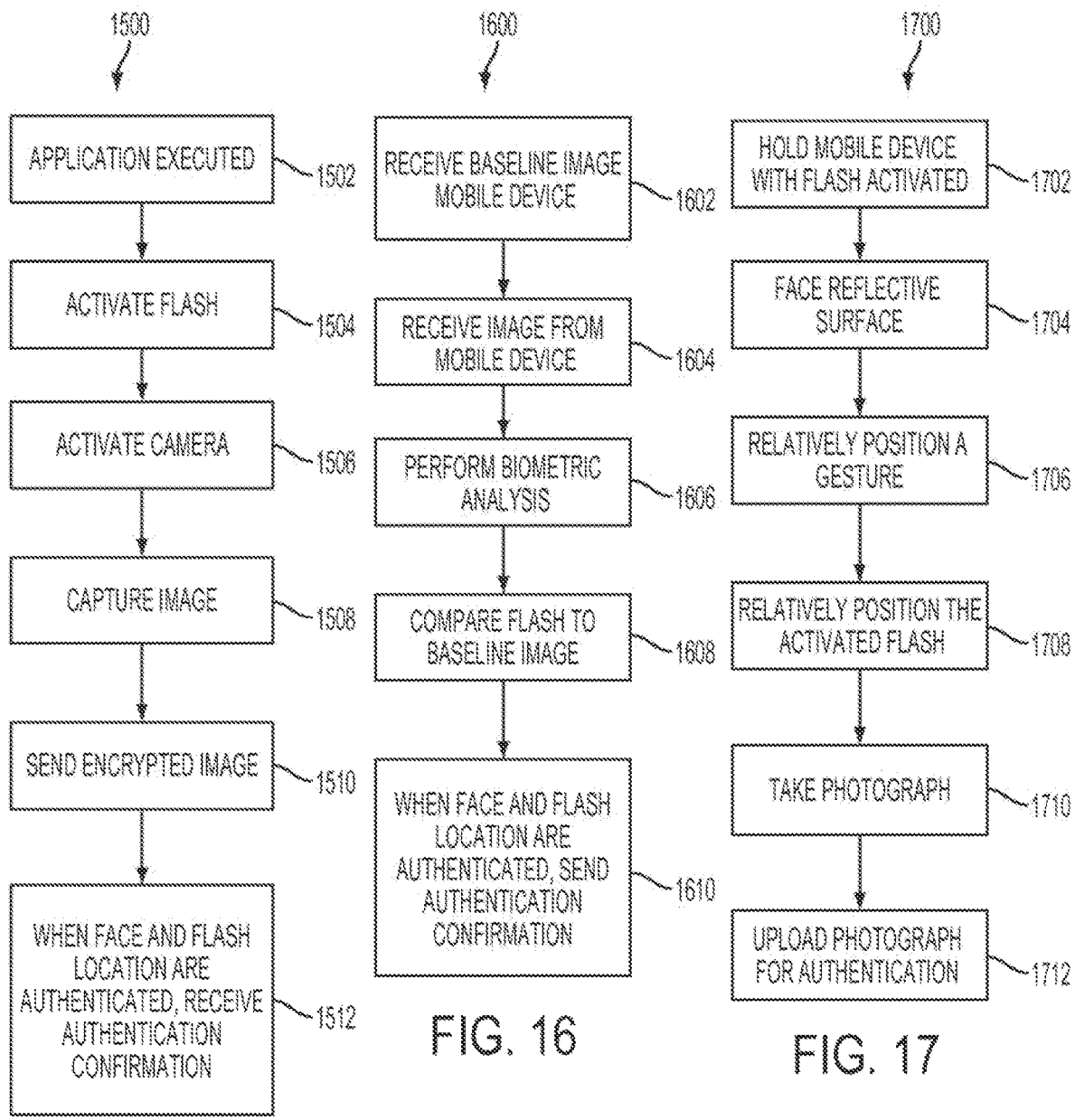
FIG. 15 illustrates an authentication process for a computing device in accordance with one non-limiting embodiment.
FIG. 16 illustrates an authentication process of an authentication computing system in accordance with one non-limiting embodiment.
FIG. 17 illustrates an authentication process in accordance with one non-limiting embodiment.

FIG. 15 illustrates an authentication process 1500 for a computing device in accordance with one non-limiting embodiment. At block 1502, an application is executed. At block 1504, a flash on the computing device is activated. At block 1506, the camera is activated. At block 1508, an image is captured by the camera. At block 1510, the image is sent to an authentication computing system. The image may be encrypted prior to transmission. In some embodiments, the computing device purges the image subsequent to the transmission so that there is no local copy of the image stored on the device. At block 1512, when the face and flash location have been authenticated by the authentication computing system, an authentication confirmation is received.

FIG. 16 illustrates an authentication process 1600 of an authentication computing system in accordance with one non-limiting embodiment. At block 1602, a baseline image is received from a mobile device. The baseline image may be stored in a baseline image database. The baseline image may contain various features, such as a gesture by a user and a relative location of a source of light. At block 1604, an image is received from the mobile device for the purposes of authentication. At block 1606, biometric analysis may be performed on the user's features (such as facial features, hand features, fingerprint features, or retinal features, for example). At block 1608, the location of the flash in the received image is compared to the location of the flash in the baseline image. In some embodiments, the baseline image must be updated (changed) periodically. In any event, at block 1610, when the face and flash location are authenticated, an authentication confirmation is sent to the mobile device. As discussed herein, additional layers of authentication may also be performed, such as analysis of locational data or device data, for example.

FIG. 17 illustrates a user's authentication process 1700 in accordance with one non-limiting embodiment. At block 1702, a user holds a mobile device with its flash activated. At block 1704, the user faces a reflective surface. At block 1706, the user makes a gesture and positions the gesture relative to their body, the mobile device, or other object. At block 1708, the user positions the active flash in a particular position. At block 1710, a photograph of the reflective surface is taken by a camera of the mobile device. At block 1712, the photograph is uploaded for authentication. As is to be appreciated, any number of authentication variables may be provided with the uploaded image at block 1712. For example, uploaded authentication variables may include, without limitation, the mobile device angle, the shutter/flash synchronicity information, location information and so forth.

Figure 18A:
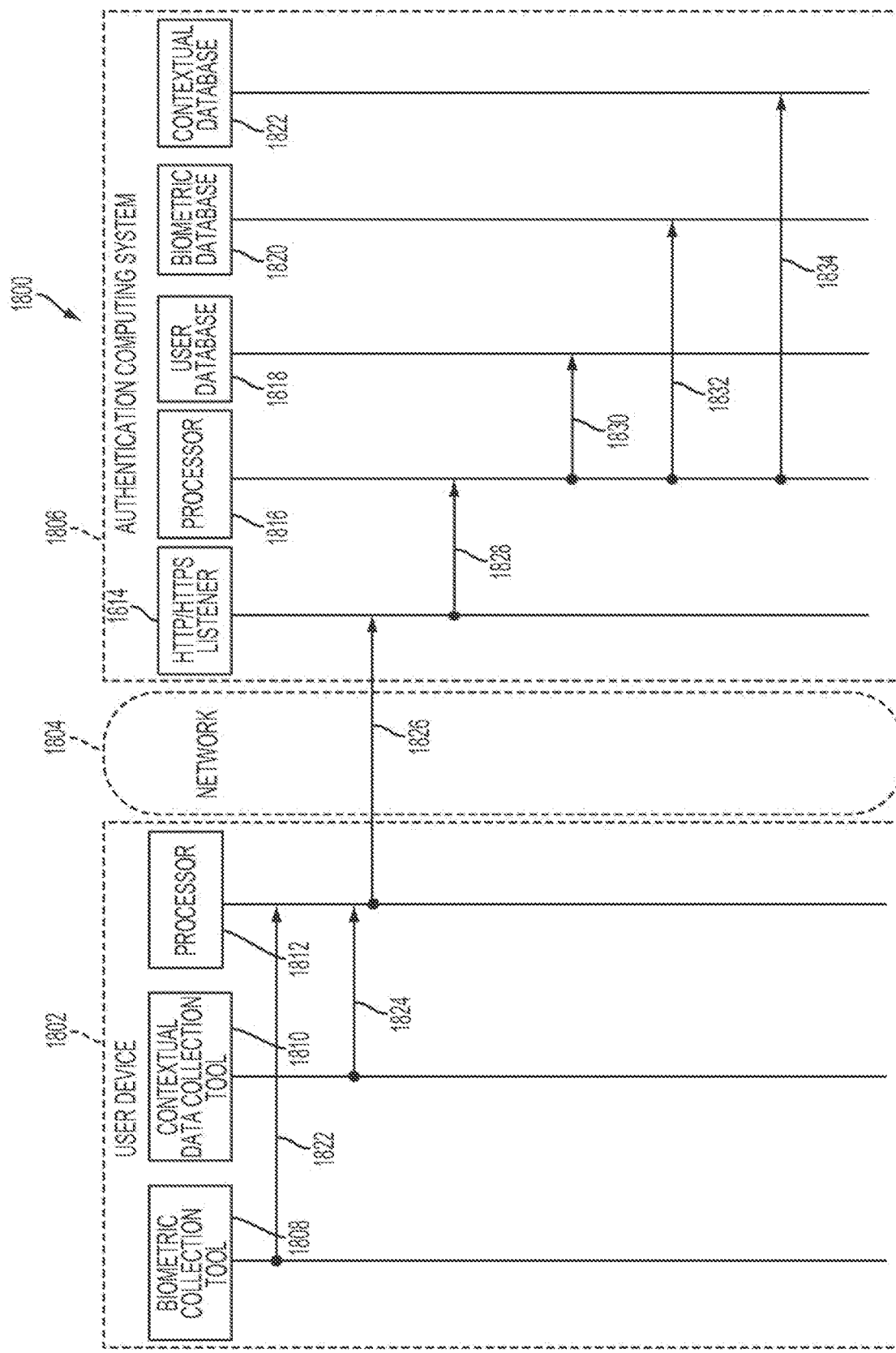
FIG. 18A illustrates an example message flow diagram for a registration process.

FIG. 18A illustrates an example message flow diagram 1800 for a registration process in accordance with one embodiment. The message flow diagram 1800 generally depicts messages utilized by a user device 1802 and an authentication computing system 1806, some of which may be sent through a communications network 1804, during user registration. The user device 1802 comprises a biometric collection tool 1808 and a contextual data collection tool 1810. The biometric collection tool 1808 may be, for example, a digital camera, a retina scanner, a fingerprint scanner or any other suitable device. The contextual data collection tool 1810 may include software and/or hardware components for acquiring data, such as geolocational data, user device movement data, machine identification data, and so forth. The biometric collection tool 1808 and a contextual data collection tool 1810 may respectively provide, via messages 1822 and 1824, data to the processor 1812. The messages 1822 and 1824 may generally provide various types of data unique to the user and the user device 1802. The processor 1812 may perform pre-transmission processing of the data, such as crop an image collected by the biometric collection tool 1808, convert an image to grey scale, convert a file type of the image (i.e., convert to .BMP), create array of images, normalize the data to a particular format, encrypt the data, and so forth.

Subsequent to any pre-transmission processing, the processor 1812 may cause a message 1826 to be sent through the communications network 1804 to the authentication computing system 1806. The message 1826 may be received by a listener 1814. The listener 1814 may be "listening," for example, to messages transmitted using HTTP or HTTPS protocols for an authentication request or a registration request. Here, the message 1826 is an authentication request so the listener 1814 provides a message 1828 which includes registration data to a processor 1816. The processor 1816 may process the information received and then provide a message 1830 to a user database 1818, a message 1832 to a biometric database 1820, and a message 1834 to a contextual database 1822. The message 1830 may identify provide user identification data (such as social security number, patient ID number, account number, etc.), the message 1832 may include, for example, image data, and the message 1834 may include, for example, geolocational data and/or machine identification data. Generally, the messages 1830, 1832, and 1834 register a user of the user device 1802 with the authentication computing system 1806. The database 1818, 1820, and 1822 may be implemented using any suitable type of database hardware or software. For example, in some embodiments, cloud-based storage systems are utilized.

Figure 18B:
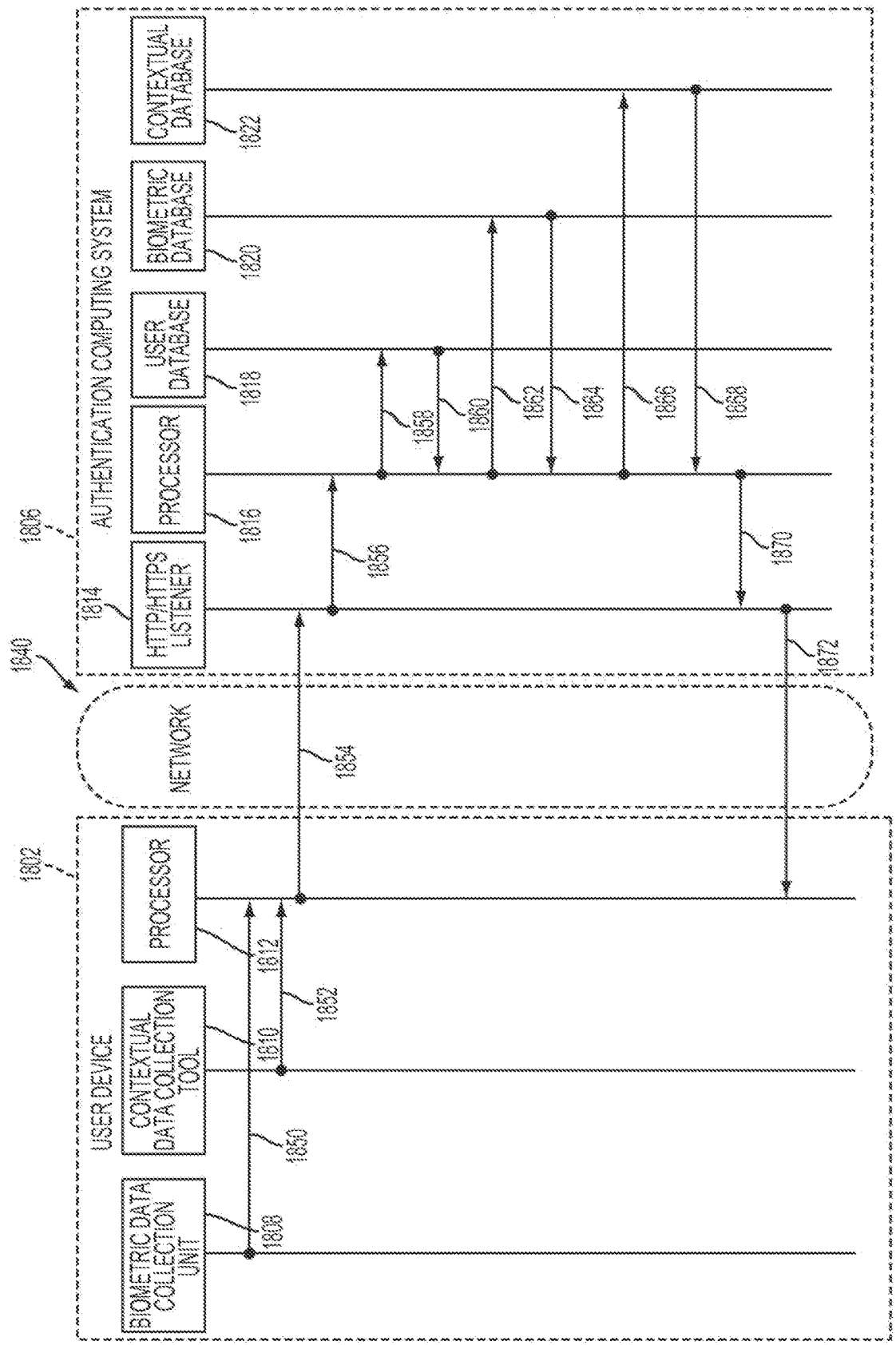
FIG. 18B illustrates an example message flow diagram for an authentication process.

FIG. 18B depicts an example message flow diagram 1840 for an authentication process in accordance with one embodiment. The message flow diagram 1840 generally depicts messages utilized by the user device 1802 and the authentication computing system 1806, some of which may be sent through the communications network 1804, during user authentication. As part of the authentication process, the biometric collection tool 1808 and the contextual data collection tool 1810 may respectively provide, via messages 1850 and 1852, data to the processor 1812. The messages 1850 and 1852 may generally provide various types of data unique to the user and the user device 1802. Similar to the processing described in FIG. 18A, the processor 1812 may perform pre-transmission processing of the data. It is noted that the contextual data delivered using message 1852 may vary. For example, the type of user device 1802 (including the type of on-board sensors) or the operational conditions (such data transmission rates, for example), may at least partially determine which type of contextual data may be transmitted to authentication purposes.

Subsequent to any pre-transmission processing, the processor 1812 may cause a message 1854 to be sent through the communications network 1804 to the authentication computing system 1806. The message 1854 may be received by a listener 1814, as described above. Here, the message 1854 is a registration request so the listener 1814 provides a message 1856, which includes authentication data, to the processor 1816. The processor 1816 may execute an authentication process utilizing various database calls. A message 1858 to the user database 1818 may seek confirmation of a user's personal data included in the message 1854, such as SSN, patient number, user name, account number, and so forth. A message 1860 may indicate whether a positive match was found.

A message 1862 to the biometric database 1818 may seek confirmation of a user's biometric data included in the message 1854, such as facial data, fingerprint data, and so forth. In some embodiments, the biometric data is a streamed collection of facial images. A message 1864 may indicate whether a positive match was found. As is to be appreciated, a positive match of the biometric data may be based on a threshold confidence level or other metric. A message 1866 to the contextual database 1822 may seek authentication of various types of additional data received from the user device 1802, such as geolocational data and/or machine identification data. A message 1868 indicates if a positive match for contextual data was found. In some embodiments, the confidence level threshold for biometric data, along with the confidence level thresholds for other types of contextual data that are analyzed may be selectively increased or decreased to adjust the overall usability of function of the authentication system.

Upon receiving and processing the information from the various databases, the processor 1816 may provide an authentication request response message 1870 to the listener 1814. In turn, the listener 1814 may transmit a message 1872 through the network 1804 to the user device 1802 indicating a positive or negative authentication.

Authentication processes in accordance with the present systems and methods may be triggered using any suitable techniques. For example, when a user seeks to access a protection computing device, application, electronic document, and so forth, the authentication process may be triggered. In some embodiments, a transponder (such as an RFID device) may be positioned proximate to a restricted access device, such as a lockable door. Upon a user approaching the restricted access device, the transponder may trigger an authentication process to activate on a user device of the user. The user device may gather and provide information, such as biometric data and contextual data, to an authentication computing system associated with door. When authentication is successfully performed, an unlock command may be transmitted to the restricted access device.

Figure 19A:
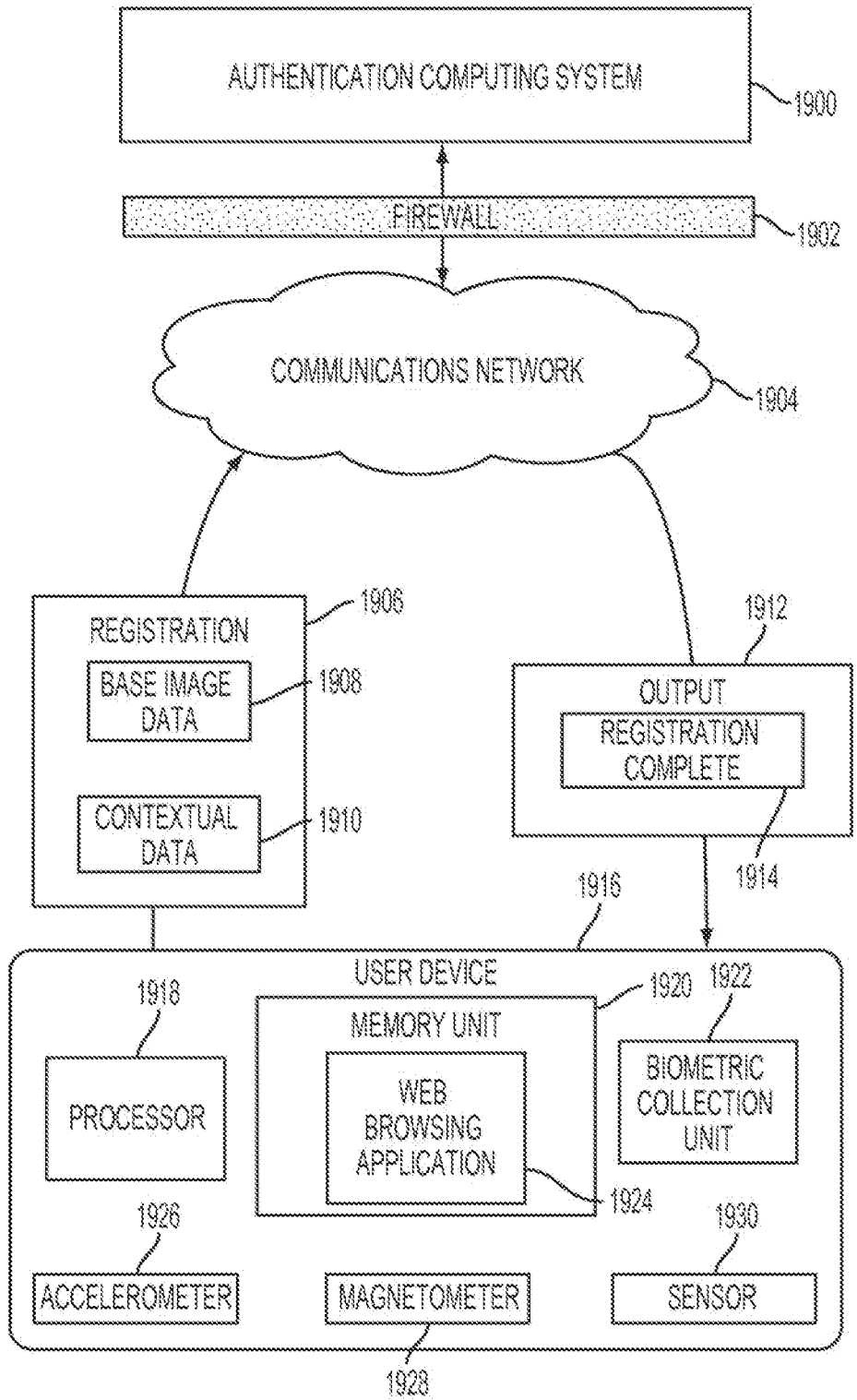
FIG. 19A illustrates an example simplified block diagram for a user registration process.

FIG. 19A illustrates an example simplified block diagram for a user registration process. In some embodiments, the authentication computing system 1900 is implemented as a DLL access server. The authentication computing system 1900 may be positioned behind a firewall 1904, which may generally serve protect enterprise data stored by the authentication computing system, for example. A user device 1916 may be in communication with the authentication computing system 1900 through a communications network 1904. The user device 1916 may be provided using any suitable processor-based device or system, such as a personal computer, laptop, server, mainframe, or a collection (e.g., network) of multiple computers, for example. The user device 1916 may include one or more processors 1918 and one or more computer memory units 1920. For convenience, only one processor 1918 and only one memory unit 1920 are shown in FIG. 19A. The processor 1918 may execute software instructions stored on the memory unit 1924, such as a web browsing application 1924. The processor 1918 may be implemented as an integrated circuit (IC) having one or multiple cores. The memory unit 1920 may include volatile and/or non-volatile memory units. Volatile memory units may include random access memory (RAM), for example. Non-volatile memory units may include read only memory (ROM), for example, as well as mechanical non-volatile memory systems, such as, for example, a hard disk drive, an optical disk drive, etc. The RAM and/or ROM memory units may be implemented as discrete memory ICs, for example.

The memory unit 1920 may store executable software and data. When the processor 1918 of the user device 1916 executes the software, the processor 1918 may be caused to perform the various operations used for registration and authentication of a use of the user device 1916, such as send information to the authentication computing system 1900 and process information received from the authentication computing system 1900.

The user device 1916 may comprise a wide variety of components, some example of which are illustrated in FIG. 19A. For example, the user device 1916 may comprise a biometric collection unit 1922 for collecting biometric information from a user of the user device 1916. In certain embodiments, the biometric collection unit 1922 is a digital camera. The user device 1916 may also include, without limitation, an accelerometer 1926, a magnetometer 1928, or any other type of sensor 1930, device, or component (such as an ambient light sensor, gyroscopic sensor, microphone, proximity sensor, and so forth) that may be used for collecting data or information that may be provided to the authentication computing system 1900 during a registration or authentication process.

During a registration process, the user device 1916 may transmit a communication 1906 to the authentication computing system 1900. The communication 1906, or at least components of the communication, may be encrypted. In the illustrated embodiment, the communication 1906 comprises base image data 1908 and contextual data 1910. The base image data 1908 may be, for example, a series of streamed images of a user. The contextual data 1910 may comprise information gathered from one or more sensors, such as magnetometer 1928, information regarding the user device 1916, such as a machine ID or ESN, for example. Upon processing by the authentication computing system 1900, an output 1912 may be provided to the user device 1916. The output 1912 may include, for example, an indication 1914 that registration is complete.

Figure 19B:
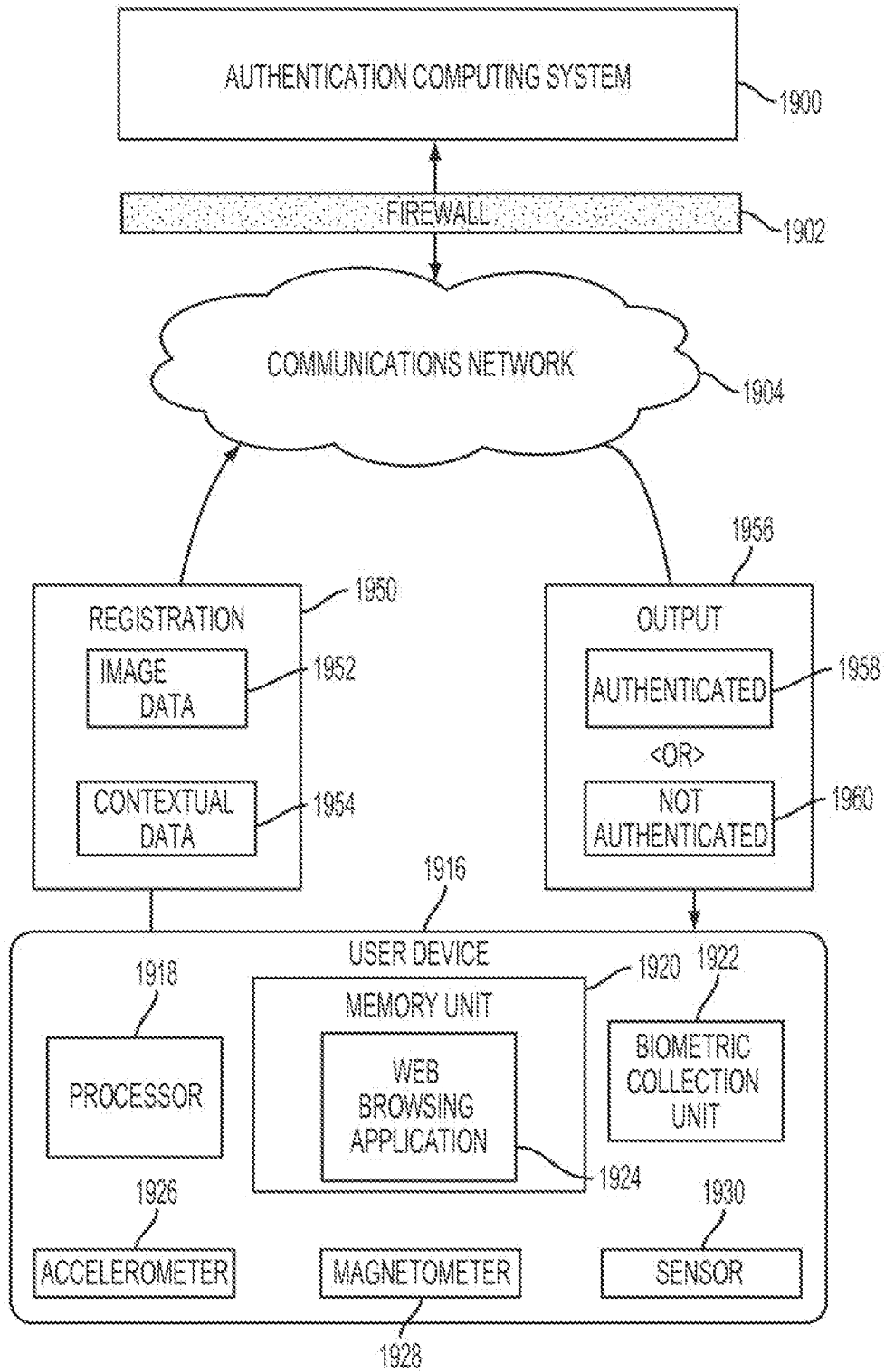
FIG. 19B illustrates an example simplified block diagram for a user authentication process.

Subsequent to registration with the authentication computing system, a use may seek an authorization request. FIG. 19B illustrates an example simplified block diagram for a user authentication process. In the illustrated embodiment, an authorization request 1950 comprises image data 1952 and contextual data 1954. The image data 1952 may be, for example, streamed image data of a user's face. The contextual data 1954 may include, for example, machine ID or ESN information, acceleration or movement data, magnetic field data, and so forth. In any event, based on the image data 1952 and the contextual data 1954, the authentication computing system 1900 may determine whether the user of the user device 1916 is an authenticated user. An output 1956 may be transmitted to the user device 1916 to convey the results of the authentication request, which may include an indication of authentication 1958 or an indication of non-authentication 1960.

Figure 20A:
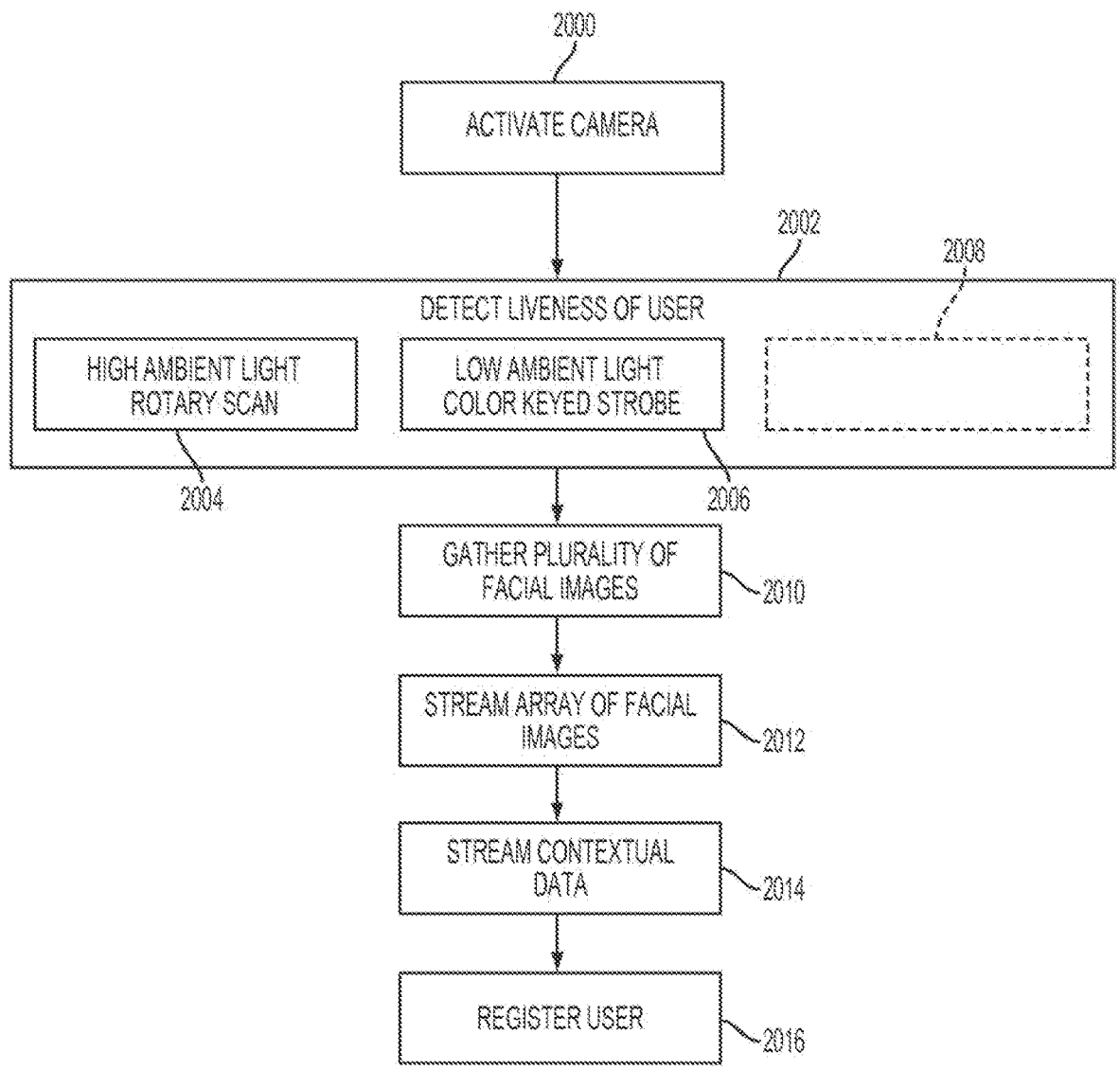
FIG. 20A illustrates an example process for registering a user with an authentication computing system.

FIG. 20A illustrates an example process for registering a user with an authentication computing system. At 2000, a camera on a user device is activated. The user device may be a component of, for example, a mobile computing device, a laptop computer, a desktop computer, a table computer, a wall-mounted device, and so forth. At 2002, the liveness of a user is detected using any suitable technique or combination of suitable techniques. The particular technique or techniques used may vary on operational conditions, such as ambient lighting conditions, available data transfer rates, battery life, and so forth. A rotary facial scan 2004 may be employed in suitable conditions, such as high ambient lighting conditions. Image collection during a color keyed strobe 2006 may be used, such as during low ambient conditions. During a color keyed strobe, a screen on a user device may be sequentially changed colors, which images of the user's face positioned close to the screen sequentially collected. Other techniques 2008 may be used to detect liveness, such as instructing a user to make certain movements, say certain words, and so forth. At 2010, a plurality of facial images are collected by the camera. In some embodiments, each facial image is a non-compressed file that is 100 pixels by 100 pixels, although other formats may be used. At 2012, an array of the images is streamed to an authentication computing system. In some embodiments, five facial images are combined into a 100 pixel by 500 pixel array. At 2014, contextual data is streamed. As provided herein, the contextual data may include, for example, machine identification data, geolocational data, movement data, and so forth. At 2016, upon satisfaction of the registration requirements, the user is registered with the authentication computing system.

Figure 20B:
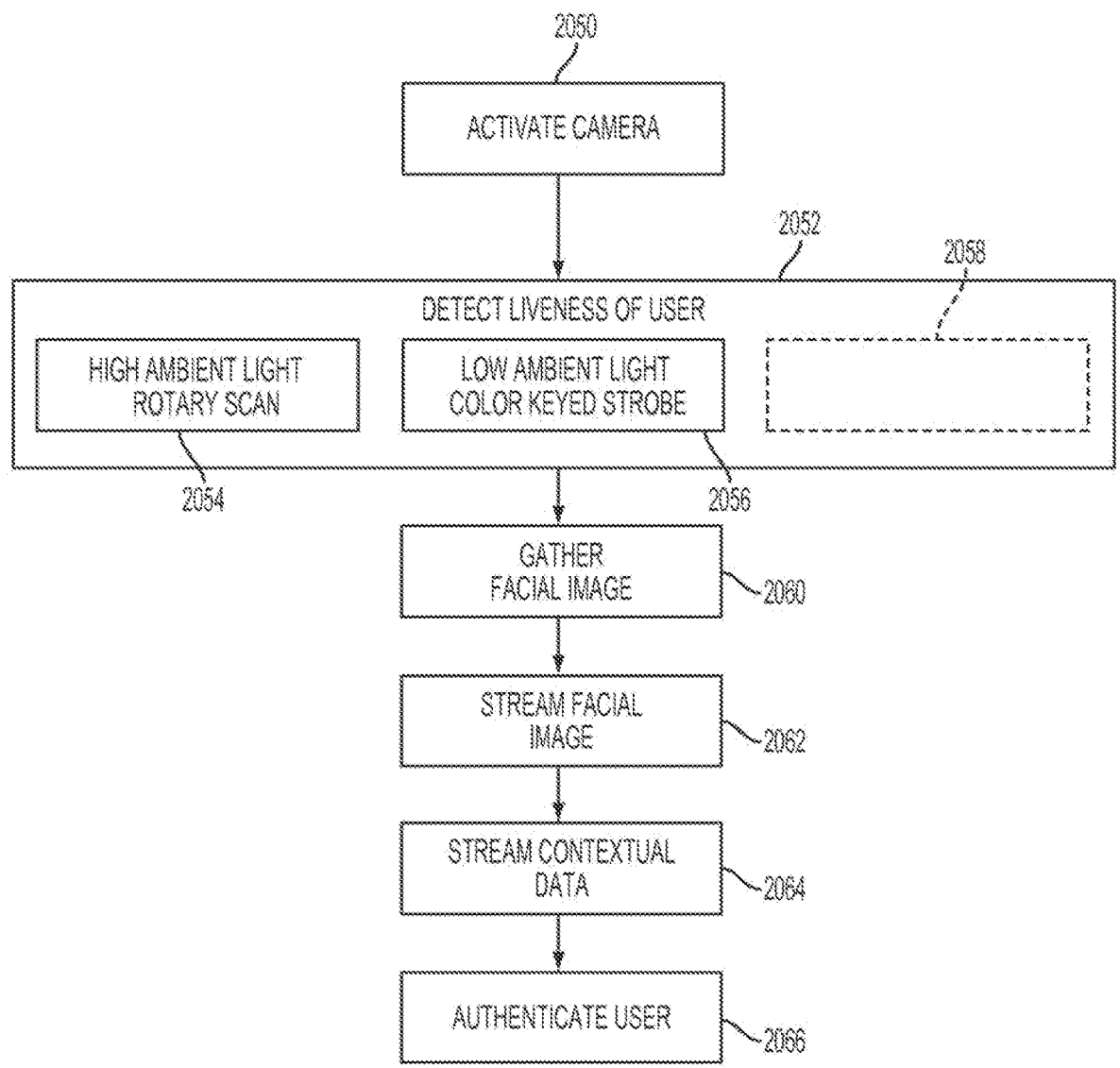
FIG. 20B illustrates an example process for authenticating a registered user of an authentication computing system.

FIG. 20B illustrates an example process for authenticating a registered user of an authentication computing system. At 2050, a camera on a user device is activated. As described above with regard to FIG. 20A, the user device may be a component of, for example, a mobile computing device, a laptop computer, a desktop computer, a table computer, a wall-mounted device, and so forth. At 2052, the liveness of the user seeking authentication is detected. Example techniques for detecting liveness during the authentication process include a rotary scan 2054, a color keyed strobe 2056, or other technique 2058, such as requiring certain movements or audio responses by a user. At 2060, one or more facial images are gathered and at 2062, the one or more facial images are streamed to an authentication computing system. At 2064, contextual data associated with the user device is streamed to the authentication computing system. At 2066, the user is authenticated based on processing of the facial images and the contextual data.

Figure 21:
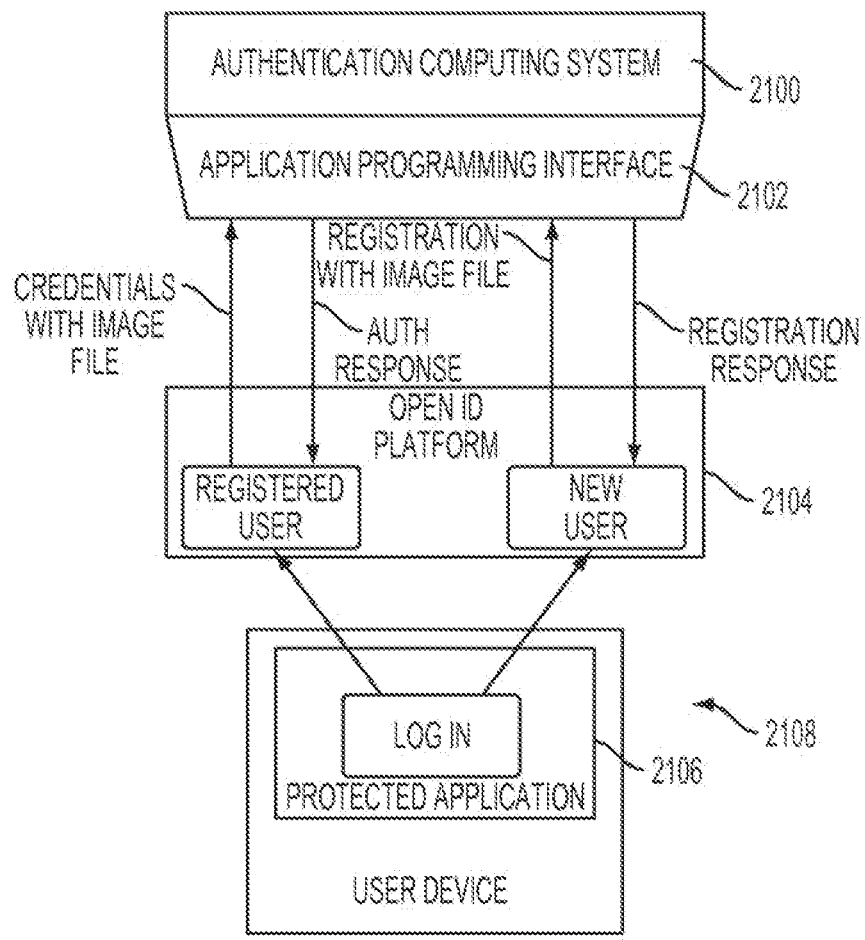
FIG. 21 illustrates an example block diagram of a communication system.

In some embodiments, an authentication computing system in accordance with the systems and methods described herein may be used by a certain relying parties, such as using an OpenID-type authentication. FIG. 21 illustrates an example communication block diagram. A protected application 2106 may be accessible via a use device 2108. The protected application 2106 may be, without limitation, a website, a local application, a remote application, and so forth. A user operating the user device may either be a registered user of the OpenID platform 2104 or need to become a registered user in order to access the protected application 2106. As illustrated, during a "new user" registration process credentials may be logged with an authentication computing system 2100. In some embodiments, the credentials include both a user ID and biometric data, such as an image. Once the user is registered with the OpenID platform 2104, the user's credentials may be provided to the authentication computing system 2100 (which may include biometric data) so that a user may be authenticated. It is noted that communications between the protected application 2106 and the authentication computing system 2100 may be facilitated through one or more application programming interfaces 2102. Accordingly, in some embodiments, the authentication computing system 2100 may generally function as a third party, biometric authentication tool for a variety of websites, applications, and the like.

Figure 22:
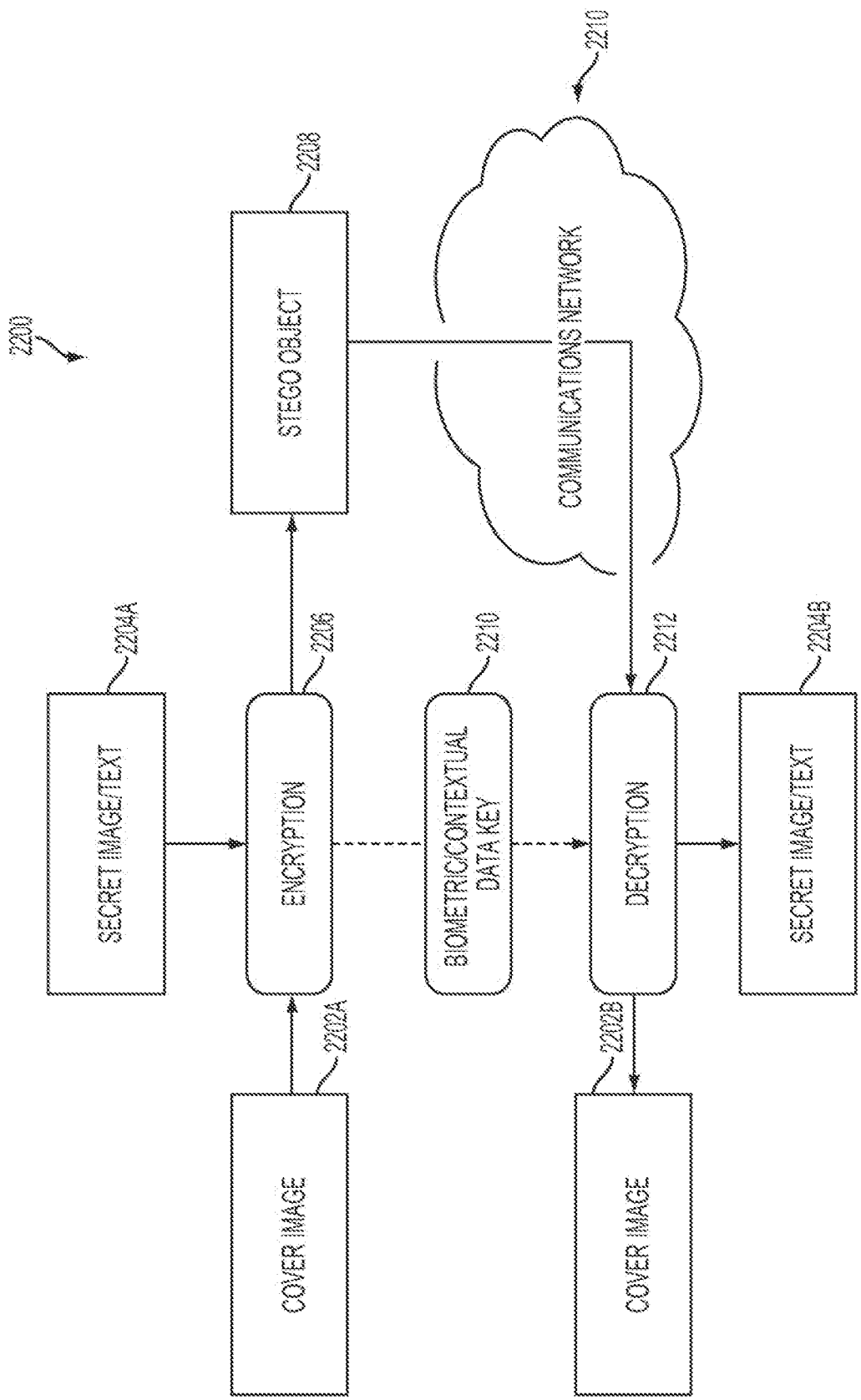
FIG. 22 illustrates a system flow diagram for photo cloaking utilizing biometric key generation.

FIG. 22 illustrates a system flow diagram 2200 for photo cloaking utilizing biometric key generation. In the illustrated embodiment, secret image/text 2204A may be any type of data that a use wishes to transmit in an encrypted format. The system flow also utilizes a cover image 2202A. At 2206, encryption is performed such that the secret image/text 2204A is hidden within the cover image 2202A utilizing a biometric/contextual data encryption technique. An example biometric/contextual data encryption technique is described in more detail below with regard to FIG. 23. A stego object 2208 is created that generally comprises the cover image 2202A with the secret image/text 2204A embedded in it. The stego object 2208 can then be transmitted through a communications network 2210, which can include, for example, a public network. At 2212, the stego object 2208 can be decrypted using the biometric/contextual data key 2210. As a result, a cover image 2204B and secret text 2204B are extracted from the stego object 2208, with the cover image 2204B and secret text 2204B being similar, or identical to, the cover image 2202A and the secret image/text 2204A.

Figure 23:
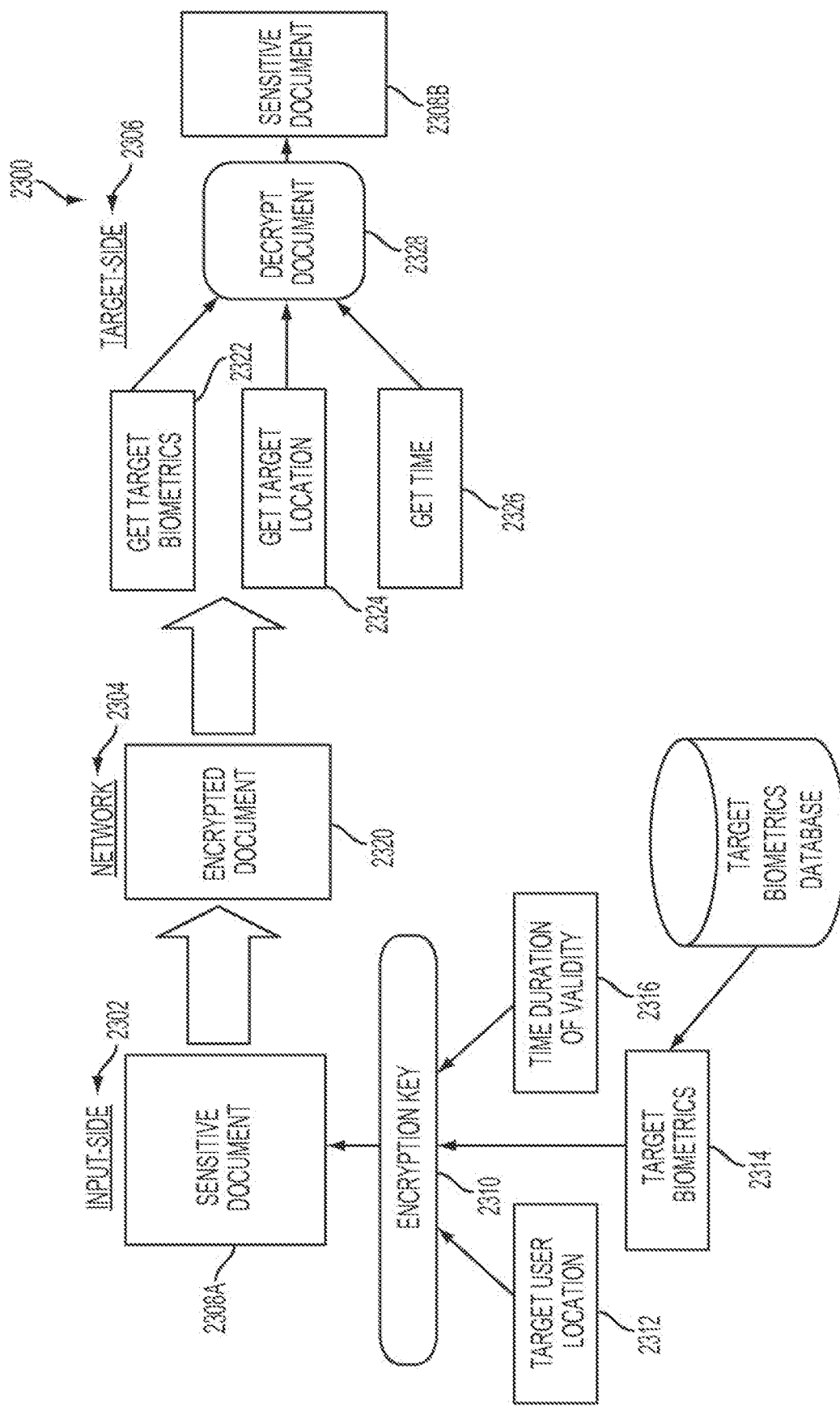
FIG. 23 illustrates an example biometric encryption system flow diagram.

FIG. 23 illustrates an example biometric encryption system flow diagram 2300. The system flow diagram generally includes three aspects, namely an input-side 2302, a network 2304, and a target-side 2306. A variety of operational environments can utilize the system flow diagram 2300, such as a first user operating a first smart phone on the input-side 2302 and communicating with a second user operating a second smart phone on the target-side 2306. The first and second user may be, for example, chatting using a real-time chatting application utilizing communications over the network 2304. Using the systems and methods described herein, the first user can share a document, image, or other type of data file utilizing the described encryption process. The data file may be shared in generally real-time using the network 2304. In the illustrated embodiment, the document desired to be shared is shown as a sensitive document 2308A. The sensitive document 2308A may be any type of data capable of being transmitted over a network. Prior to transmitting the sensitive document 2308A, it may be encrypted using an encryption key 2310. Generally, the encryption key 2310 enables the sensitive document 2308A to be securely shared over a public network and requiring the target recipient to provide biometric and contextual data to access the sensitive document 2308A. In the illustrated embodiment, a plurality of variants are provided at the input-side 2302 to form the encryption key 2310, including a target user location 2312, target biometrics 2314, and a time duration of validity 2316. The target user location 2312 provided may vary based on implementation. In some cases, a city or address of the target is provided. In some cases, latitude and longitude coordinates are provided. Other implementations may use other techniques for identifying a geographic location of a target. The target biometrics 2314 can include, for example, an image of the target user stored within a target biometrics database 2318. The target biometrics database 2318 can be local to the input side 2302, or hosted by a third party, such as a social networking website, or example. In some embodiments, the target biometrics 2314 is an image selected from a digital photo album stored on a user device.

In some embodiments, target biometrics 2314 may include the biometrics for N recipients, as described above with regard to FIG. 12. In any event, the encryption key 2310 may then be created based on the biometric data of the target along with various forms of contextual information. Once the encryption key 2310 key is generated, an encrypted document 2320 may then be transmitted via the network 2304 to a user device of the target. In order to retrieve the sensitive document, target biometrics are retrieved 2322 (i.e., using a camera associated with a user device of the target), target location is retrieved 2324 (i.e, based on GPS data), and a time of access 2326 is determined (i.e, based on network time). When the target satisfies the confidence thresholds associated with all of the various variables, the document is decrypted at 2328 and a copy of the sensitive document 2308B may be provided to the target. As is to be readily appreciated, the authentication process at the target-side 2306 can include any of various authentication techniques described herein, such as color strobing, liveness detection, moving image scans, and so forth. Furthermore, when biometric encryption system flow diagram 2300 is used with one-to-many file sharing scenarios, similar to those described above, the document may be decrypted at 2328 only after a sufficient number of recipients, such as k recipients, provide their biometrics to an authentication engine.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

We claim:

1. A method, comprising:
   receiving an authentication request associated with a particular user, said authentication request including biometric information from said particular user;
   determining whether said biometric information from said particular user corresponds to baseline biometric data associated with said particular user;
   selecting a predefined act from a plurality of predefined acts, said selected, predefined act involving relative movement between said particular user and a camera;
   providing an action request to said particular user, said action request requiring said particular user to perform and record said selected predefined act;
   receiving a recording of said particular user performing said selected, predefined act;
   receiving contextual data associated with said recording;
   determining whether said recording indicates a live performance of said selected, predefined act by said particular user, based at least in part on said recording;
   determining whether said contextual data corresponds to expected contextual data associated with said particular user;
   authenticating said particular user if said biometric information from said particular user corresponds to said baseline biometric data associated with said particular user, said recording indicates a live performance of said selected, predefined act by said particular user, and said received contextual data corresponds to said expected contextual data; and
   providing access to a resource to said particular user based on said authentication of said particular user.

2. The method of claim 1, wherein said action request requires said user to illuminate a color while said camera records said act.

3. The method of claim 1, wherein said action request requires said user to generate a flash at a location while said camera records said flash.

4. The method of claim 1, wherein said action request requires said user to perform a gesture while said camera records said user performing said gesture.

5. The method of claim 1, wherein said action request requires said user to cause a flash at an angle relative to said camera while said camera records said flash at said angle relative to said camera.

6. The method of claim 1, wherein said action request requires said user to perform a gesture and at the same time cause a flash while said camera observes said gesture.

7. The method of claim 1, further comprising determining that authentication is required based at least in part on conditions.

8. The method of claim 7, wherein said conditions include contextual operational information comprising a geographical location of said user, a time period since a previous successful authentication, or a distance between a current location of said user and a location of said user during said previous authentication.

9. The method of claim 1, further comprising receiving a request to access said resource from said user.

10. The method of claim 1, wherein said recording is encrypted.

11. The method of claim 10, wherein said recording is encrypted utilizing a chaos-based encryption method.

12. The method of claim 1, wherein said resource includes data stored in a blockchain.

13. A server providing access to a resource, said server comprising:
a hardware processor configured to execute code; and
memory storing data and said code, said data including software that, when executed by said processor, causes said server to
receive an authentication request associated with a particular user, said authentication request including biometric information from said particular user;
determine whether said biometric information from said particular user corresponds to baseline biometric data associated with said particular user;
select a predefined act from a plurality of predefined acts, said selected, predefined act involving relative movement between said particular user and a camera;
provide an action request to said particular user, said action request requiring said particular user to perform and record said selected, predefined act,
receive a recording of said user performing said selected, predefined act,
receive contextual data associated with said recording,
determine whether said recording indicates a live performance of said selected, predefined act by said particular user, based at least in part on said recording,
authenticate said particular user if said biometric information from said particular user corresponds to said baseline biometric data associated with said particular user, said recording indicates a live performance of said selected, predefined act by said particular user, and said received contextual data corresponds to said expected contextual data, and
provide access to a resource to said particular user based on said authentication of said particular user.

14. A method for authenticating a user to allow said user to access functionality of a restricted access device, said method comprising:
detecting a user approaching said restricted access device, thereby causing said restricted access device to trigger an authentication process on a user device separate from said restricted access device;
providing contextual data to an authentication computing system associated with said restricted access device, said contextual data being indicative of an identity of said user;
providing, from said user to said authentication computing system, biometric data associated with said user;
determining whether said biometric data provided from said user corresponds to baseline biometric data associated with said user;
providing, to said user device, an action request, said action request requiring said user to record an act that involves relative movement between said user and a camera;
providing, to said authentication computing system, a recording of said user performing said act and second contextual data;
determining, from said recording, whether said recording indicates a live performance of said act by said user;
determining whether said second contextual data corresponds to contextual data expected from said user device;
authenticating said identity of said user with said authentication computing system if said biometric data corresponds to said baseline biometric data, said recording indicates a live performance of said act by said user, and said second contextual data corresponds to contextual data expected from said user using at least said; and
providing an unlock command to said restricted access device, when said identity of said user is successfully authenticated.

15. The method of claim 14, wherein:
said restricted access device is a door lock; and
said unlock command causes said door lock to unlock.

16. The method of claim 14, further comprising placing a transponder proximate to said restricted access device, wherein:
said transponder is configured to determine if said user has approached said restricted access device; and
said transponder is configured to trigger said authentication process on said user device.

17. The method of claim 14, wherein said contextual data includes data indicative of a location of said user device.

18. The method of claim 14, wherein:
said restricted access device is a computing device; and
said unlock command allows said functionality of said computing device to be accessible by said user.

* * * * *